United States Patent
Xian et al.

(10) Patent No.: US 11,748,940 B1
(45) Date of Patent: Sep. 5, 2023

(54) SPACE-TIME REPRESENTATION OF DYNAMIC SCENES

(71) Applicant: META PLATFORMS TECHNOLOGIES, LLC, Menlo Park, CA (US)

(72) Inventors: Wenqi Xian, New York, NY (US); Jia-Bin Huang, Blacksburg, VA (US); Johannes Peter Kopf, Medina, WA (US); Changil Kim, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 71 days.

(21) Appl. No.: 17/498,505

(22) Filed: Oct. 11, 2021

(51) Int. Cl.
  *G06T 15/20* (2011.01)
  *G06N 3/08* (2023.01)

(52) U.S. Cl.
  CPC .......... *G06T 15/205* (2013.01); *G06N 3/08* (2013.01)

(58) Field of Classification Search
  None
  See application file for complete search history.

(56) References Cited

U.S. PATENT DOCUMENTS

| | | | | |
|---|---|---|---|---|
| 7,151,545 B2 * | 12/2006 | Spicer | ..................... | G06T 11/40 345/543 |
| 11,546,568 B1 * | 1/2023 | Yoon | ..................... | H04N 13/128 |
| 2018/0189667 A1 * | 7/2018 | Tsou | ..................... | G06N 5/01 |
| 2022/0222897 A1 * | 7/2022 | Yang | ..................... | G06V 20/64 |
| 2022/0301241 A1 * | 9/2022 | Kim | ..................... | G06T 11/008 |
| 2022/0301257 A1 * | 9/2022 | Garbin | ..................... | G06N 3/045 |
| 2022/0343522 A1 * | 10/2022 | Bi | ..................... | H04N 13/111 |

OTHER PUBLICATIONS

Wiles O., et al., "SynSin: End-to-End View Synthesis From a Single Image," Computer Vision and Pattern Recognition (CVPR), 2020, pp. 7467-7477.
Xu R., et al., "Deep Flow-Guided Video Inpainting," Computer Vision and Pattern Recognition (CVPR), 2019, pp. 3723-3732.
Yao Y., et al., "MVSNet: Depth Inference for Unstructured Multi-view Stereo," European Conference on Computer Vision (ECCV), 2018, 17 Pages.

(Continued)

*Primary Examiner* — Anh-Tuan V Nguyen
(74) *Attorney, Agent, or Firm* — Baker Botts L.L.P.

(57) ABSTRACT

In one embodiment, a computing system may determine a view position, a view direction, and a time with respect to a scene. The system may access a spatiotemporal representation of the scene generated based on (1) a monocular video including images each capturing at least a portion of the scene at a corresponding time and (2) depth values of the portion of the scene captured by each image. The system may generate an image based on the view position, the view direction, the time, and the spatiotemporal representation. A pixel value of the image corresponding to the view position may be determined based on volume densities and color values at sampling locations along the view direction and at the time in the spatiotemporal representation. The system may output the image to the display, representing the scene at the time as viewed from the view position and in the view direction.

20 Claims, 9 Drawing Sheets

(56) References Cited

OTHER PUBLICATIONS

Yoon J.S., et al., "Novel View Synthesis of Dynamic Scenes With Globally Coherent Depths From a Monocular Camera," Computer Vision and Pattern Recognition (CVPR), 2020, pp. 5336-5345.
Zhang K., et al., "NeRF++: Analyzing and Improving Neural Radiance Fields," arXiv preprint arXiv:2010.07492, 2020, 9 Pages.
Zhou T., et al., "Stereo Magnification: Learning View Synthesis using Multiplane Images," ACM Transactions Graph, Aug. 2018, vol. 37 (4), Article 65, pp. 65:1-65:12.
Zhou T., et al., "View Synthesis by Appearance Flow," European Conference on Computer Vision (ECCV), 2016, pp. 286-301.
Zitnick C.L., et al., "High-Quality Video View Interpolation Using a Layered Representation," ACM Transactions on Graphics (Proc. SIGGRAPH), 2004, vol. 23, No. 3, pp. 600-608.
Zollhofer M., et al., "State of the Art on 3D Reconstruction with RGB-D Cameras," Computer Graphics Forum, 2018, vol. 37, No. 2, pp. 625-652.
Adelson E.H., et al, "The Plenoptic Function and the Elements of Early Vision," Computational Models of Visual Processing, MIT Press, 1991, pp. 3-20.
Andersson P., et al., "FLIP: A Difference Evaluator for Alternating Images," Proceedings of the ACM on Computer Graphics and Interactive Techniques, 2020, vol. 3, No. 2, pp. 1-23.
Anonymous: "JaxNeRF," Google, 2020, 5 pages, Retrieved from the Internet: https://github.com/google-research/google-research/tree/master/jaxnerf.
Bemana M., et al., "X-Fields: Implicit Neural View-, Light- and Time-Image Interpolation," ACM Transactions on Graphics (TOG), 2020, vol. 39, No. 6, pp. 1-15.
Bi S., et al., "Deep Reflectance Volumes: Relightable Reconstructions from Multi-View Photometric Images," arXiv: 2007.09892, 2020, 21 pages.
Boss M., et al., "NeRD: Neural Reflectance Decomposition from Image Collections," arXiv:2012.03918, 2020, 15 pages.
Chai J-X., et al., "Plenoptic Sampling," Proceedings of the 27th annual conference on Computer graphics and interactive techniques, 2000, pp. 307-318.
Chen S.E., et al., "View Interpolation for Image Synthesis," In ACM SIGGRAPH Conference Proceedings, 1993, pp. 279-288.
Davis A., et al., "Unstructured Light Fields," Computer Graphics Forum, vol. 31 (2), 2012, pp. 305-314.
Debevec P., et al., "Acquiring the Reflectance Field of a Human Face," Proceedings of the 27th Annual Conference on Computer Graphics and Interactive Techniques, 2000, pp. 145-156.
Debevec P.E., et al., "Modeling and Rendering Architecture from Photographs: A Hybrid Geometry-and Image-Based Approach," Proceedings of the 23rd Annual Conference on Computer Graphics and Interactive Techniques, 1996, pp. 11-20.
Du Y., et al., "Neural Radiance Flow for 4D View Synthesis and Video Processing," arXiv:2012.09790, 2020, 14 pages.
Esteban C.H., et al., "Silhouette and Stereo Fusion for 3D Object Modeling," Computer Vision and Image Understanding, 2004, vol. 96, No. 3, pp. 367-392.
Flynn J., et al., "DeepView: View Synthesis with Learned Gradient Descent," Proceedings of the IEEE Conference on Computer Vision and Pattern Recognition (CVPR), 2019, 2367-2376.
Furukawa Y., et al., "Accurate, Dense, and Robust Multiview Stereopsis," IEEE Transactions on Pattern Analysis and Machine Intelligence, 2009, vol. 32, No. 8, pp. 1362-1376.
Geman S., et al., "Bayesian Image Analysis: An Application to Single Photon Emission Tomography," American Statistical Association, 1985, pp. 12-18.
Gortler S. J., et al., "The Lumigraph," Proceedings of the 23rd Annual Conference on Computer Graphics and Interactive techniques, 1996, pp. 43-54.
Guo K., et al., "The Relightables: Volumetric Performance Capture of Humans with Realistic Relighting," ACM Transactions on Graphics, Article 217, vol. 38(6), Nov. 2019, pp. 1-19.
Huang Z., et al., "Deep Volumetric Video from Very Sparse Multi-View Performance Capture," Proceedings of the European Conference on Computer Vision (ECCV), 2018, pp. 336-354.
Kanade T., et al., "Virtualized Reality: Constructing Virtual Worlds from Real Scenes," IEEE Multimedia, 1997, vol. 4, No. 1, pp. 34-47.
Kaplanyan A. S., et al., "DeepFovea: Neural Reconstruction for Foveated Rendering and Video Compression Using Learned Statistics of Natural Videos," ACM Transactions on Graphics (TOG), Nov. 8, 2019, vol. 38 (6), pp. 1-13.
Kar A., et al., "Learning a Multi-View Stereo Machine," Advances in Neural Information Processing Systems (NeurIPS), 2017, pp. 365-376.
Kingma D.P., et al., "Adam: A Method for Stochastic Optimization," International Conference on Learning Representations (ICLR 2015), arXiv:1412.6980v9 [cs.LG], Jan. 30, 2017, 15 pages.
Lassner C., et al., "Pulsar: Efficient Sphere-Based Neural Rendering," arXiv:2004.07484, 2020, 13 pages.
Laurentini A., "The Visual Hull Concept for Silhouette-Based Image Understanding," IEEE Transactions on Pattern Analysis and Machine Intelligence, 1994, vol. 16, No. 2, pp. 150-162.
Levoy M., et al., "Light Field Rendering," Proceedings of the 23rd Annual Conference on Computer Graphics and Interactive Techniques, 1996, pp. 31-42.
Li H., et al., "Temporally Coherent Completion of Dynamic Shapes," ACM Transactions on Graphics (TOG), 2012, vol. 31, No. 1, pp. 1-11.
Li Z., et al., "Crowdsampling the Plenoptic Function," European Conference on Computer Vision (ECCV), 2020, pp. 178-196.
Li Z., et al., "Neural Scene Flow Fields for Space-Time View Synthesis of Dynamic Scenes," arXiv:2011.13084, 2020, 11 pages.
Lindell D.B., et al., "AutoInt: Automatic Integration for Fast Neural Volume Rendering," arXiv:2012.01714, 2020, 15 pages.
Lombardi S., et al., "Neural Volumes: Learning Dynamic Renderable Volumes from Images," ACM Transactions Graph, Jun. 18, 2019, vol. 38 (4), Article 65, pp. 1-14, XP081383263.
Marwah K., et al., "Compressive Light Field Photography using Overcomplete Dictionaries and Optimized Projections," ACM Transactions on Graphics (TOG), 2013, vol. 32, No. 4, pp. 1-12.
Meka A., et al., "Deep Reflectance Fields: High-Quality Facial Reflectance Field Inference from Color Gradient Ilumination," ACM Transactions on Graphics (TOG), 2019, vol. 38, No. 4, pp. 1-12.
Meshry M., et al., "Neural Rerendering in the Wild," Proceedings of the IEEE Conference on Computer Vision and Pattern Recognition (CVPR), 2019, pp. 6878-6887.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Muller T., et al., "Neural Importance Sampling," ACM Transactions on Graphics (TOG), 2019, vol. 38, No. 5, pp. 1-19.
Park K., et al., "Deformable Neural Radiance Fields," arXiv preprint arXiv:2011.12948, 2020, 12 pages.
Pumarola A., et al., "D-NeRF: Neural Radiance Fields for Dynamic Scenes," arXiv:2011.13961, 2020, 10 pages.
Rebain D., et al., "DeRF: Decomposed Radiance Fields," arXiv:2011.12490, 2020, 14 pages.
Sara U., et al., "Image Quality Assessment through FSIM, SSIM, MSE and PSNR—A Comparative Study," Journal of Computer and Communications, 2019, vol. 7, No. 3, pp. 8-18.
Schonberger J. L., et al., "Pixelwise View Selection for Unstructured Multi-View Stereo," European Conference on Computer Vision (ECCV), Jul. 27, 2016, 18 pages.
Schwarz K., et al., "GRAF: Generative Radiance Fields for 3D-Aware Image Synthesis," Advances in Neural Information Processing Systems (NeurIPS), 2020, vol. 33, 13 pages.
Sitzmann V., et al., "Deep Voxels: Learning Persistent 3D Feature Embeddings," Computer Vision and Pattern Recognition, Apr. 11, 2019, 10 pages.
Starck J., et al., "Surface Capture for Performance-Based Animation," IEEE Computer Graphics and Applications, 2007, vol. 27 (3), pp. 21-31.

(56) References Cited

OTHER PUBLICATIONS

Tancik M., et al., "Fourier Features Let Networks Learn High Frequency Functions in Low Dimensional Domains," arXiv:2006.10739, 2020, 24 pages.
Tancik M., et al., "Learned Initializations for Optimizing Coordinate-Based Neural Representations," arXiv:2012.02189, 2020, 13 pages.
Tretschk E., et al., "Non-Rigid Neural Radiance Fields: Reconstruction and Novel View Synthesis of a Deforming Scene from Monocular Video," arXiv:2012.12247, 2020, 9 pages.
Trevithick A., et al., "GRF: Learning a General Radiance Field for 3D Scene Representation and Rendering," arXiv:2010.04595, 2020, 28 pages, https://arxiv.org/abs/2010.04595.
Upchurch P., et al., "From A to Z: Supervised Transfer of Style and Content using Deep Neural Network Generators," arXiv:1603.02003, 2016, 11 pages.
Waechter M., et al., "Let there be Color! Largescale Texturing of 3D Reconstructions," European Conference on Computer Vision (ECCV), 2014, pp. 836-850.
Attal B., et al., "MatryODShka: Real-Time 6D0F Video View Synthesis using Multi-Sphere Images," European Conference on Computer Vision (ECCV), 2020, 19 Pages.
Atzmon M., et al., "SAL: Sign Agnostic Learning of Shapes from Raw Data," Computer Vision and Pattern Recognition (CVPR), 2020, pp. 2565-2574.
Ballan L., et al., "Unstructured Video-Based Rendering: Interactive Exploration of Casually Captured Videos," ACM Transactions on Graphics (Proc. SIGGRAPH), Jul. 2010, vol. 29 (4), Article 87, 10 pages.
Bansal A., et al., "4D Visualization of Dynamic Events from Unconstrained Multi-View Videos," Computer Vision and Pattern Recognition (CVPR), 2020, pp. 5366-5375.
Broxton M., et al., "Immersive Light Field Video with a Layered Mesh Representation," ACM Transactions on Graphics, Article 86, Jul. 2020, vol. 39 (4), 15 pages.
Butler D.J., et al., "A Naturalistic Open Source Movie for Optical Flow Evaluation," European Conference on Computer Vision (ECCV), 2012, pp. 611-625.
Carranza J., et al., "Free-Viewpoint Video of Human Actors," ACM Transactions on Graphics (Proc. SIGGRAPH), 2003, vol. 22, No. 3, pp. 569-577.
Choi I., et al., "Extreme View Synthesis," International Conference on Computer Vision (ICCV), 2019, pp. 7781-7790.
Collet A., et al., "High-Quality Streamable Free-Viewpoint Video," ACM Transactions on Graphics (Proc. SIGGRAPH), 2015, vol. 34, No. 4, pp. 1-13.
Curless B., et al., "A Volumetric Method for Building Complex Models from Range Images," Special Interest Group an Computer Graphics, 1996, pp. 303-312.
Dabala L., et al., "Efficient Multi-Image Correspondences for On-line Light Field Video Processing," In Computer Graphics Forum, 2016, vol. 35, No. 7, pp. 401-410.
Dou M., et al., "Fusion 4D: Real-time Performance Capture of Challenging Scenes," ACM Transactions on Graphics, Jul. 2016, vol. 35 (4), pp. 114:1-114:13.
Furukawa Y., et al., "Multi-View Stereo: A Tutorial," Foundations and Trends(R) in Computer Graphics and Vision, 2015, vol. 9, Nos. 1-2, pp. 1-148.
Gao C., et al., "Flow-Edge Guided Video Completion," European Conference on Computer Vision (ECCV), 2020, 17 Pages.
Gu X., et., "Cascade Cost Volume for High-Resolution Multi-View Stereo and Stereo Matching," Computer Vision and Pattern Recognition (CVPR), 2020, pp. 2495-2504.
Habermann M., et al., "LiveCap: Real-Time Human Performance Capture from Monocular Video," ACM Transactions on Graphics (Proc. SIGGRAPH), 2019, vol. 38, No. 2, pp. 1-17.
Hedman P., et al., "Deep Blending for Free-Viewpoint Image-Based Rendering," ACM Transactions on Graphics, Nov. 2018, vol. 37 (6), Article 257, pp. 1-15.

Huang J-B., et al., "Temporally Coherent Completion of Dynamic Video," ACM Transactions on Graphics (Proc. SIGGRAPH Asia), 2016, vol. 35, No. 6, pp. 1-11.
Huang P-H., et al., "DeepMVS: Learning Multi-View Stereopsis," Computer Vision and Pattern Recognition (CVPR), 2018, pp. 2821-2830.
Ilan S., et al., "A Survey on Data-Driven Video Completion," Computer Graphics Forum, 2015, vol. 34, No. 6, pp. 60-85.
Innmann M., et al., "VolumeDeform: Real-Time Volumetric Non-Rigid Reconstruction," European Conference on Computer Vision (ECCV), Jul. 30, 2016, 17 pages.
Izadi S., et al., "KinectFusion: Real-Time 3D Reconstruction and Interaction Using a Moving Depth Camera," In Proceedings of the 24th Annual ACM Symposium on User Interface Software and Technology, 2011, pp. 559-568.
Kalantari N.K., et al., "Learning-Based View Synthesis for Light Field Cameras," ACM Transactions on Graphics (Proc. SIGGRAPH), Nov. 2016, vol. 35 (6), Article 193, 193:1-193:10, 10 pages.
Kopf J., et al., "One Shot 3D Photography," ACM Transactions on Graphics (Proc. SIGGRAPH), 2020, vol. 39, No. 4, pp. 76:1-76:13.
Liu C., et al., "Neural RGB(r)D Sensing: Depth and Uncertainty From a Video Camera," Computer Vision and Pattern Recognition (CVPR), 2019, pp. 10986-10995.
Liu L., et al., "Neural Sparse Voxel Fields," Neural Information Processing Systems (NeurIPS), 2020, 20 Pages.
Luo X., et al., "Consistent Video Depth Estimation," ACM Transactions on Graphics (Proc. SIGGRAPH), 2020, vol. 39, No. 4, pp. 71:1-71:13.
Martin-Brualla R., et al., "NeRF in the Wild: Neural Radiance Fields for Unconstrained Photo Collections," Computer Vision and Pattern Recognition (CVPR), 2020, arXiv: 2008.02268v2 [cs.CV], 14 Pages.
Mescheder L., et al., "Occupancy Networks: Learning 3D Reconstruction in Function Space," Computer Vision and Pattern Recognition (CVPR), 2019, pp. 4460-4470.
Michalkiewicz M., "Implicit Surface Representations As Layers in Neural Networks," International Conference on Computer Vision (ICCV), 2019, pp. 4743-4752.
Mildenhall B., et al., "NeRF: Representing Scenes as Neural Radiance Fields for View Synthesis," European Conference on Computer Vision (ECCV), Aug. 3, 2020, 25 pages.
Newcombe R.A., et al., "DynamicFusion: Reconstruction and Tracking of Non-Rigid Scenes in Real-Time," In: IEEE Conference on Computer Vision and Pattern Recognition, CVPR 2015, Boston, MA, USA, Jun. 7-12, 2015, pp. 343-352.
Newcombe R.A., et al., "KinectFusion: Real-Time Dense Surface Mapping and Tracking," International Symposium on Mixed and Augmented Reality (ISMAR), 2011, 10 Pages.
Niebner M., et al., "Real-time 3D Reconstruction at Scale Using Voxel Hashing," ACM Transactions on Graphics (Proc. SIGGRAPH), 2013, vol. 32, No. 6, 11 Pages.
Niemeyer M., et al., "Differentiable Volumetric Rendering: Learning Implicit 3D Representations Without 3D Supervision," Computer Vision and Pattern Recognition (CVPR), 2020, pp. 3504-3515.
Niemeyer M., et al., "Occupancy Flow: 4D Reconstruction by Learning Particle Dynamics," International Conference on Computer Vision (ICCV), 2019, pp. 5379-5389.
Niklaus S., et al., "3D Ken Burns Effect from a Single Image," ACM Transactions on Graphics (Proc. SIGGRAPH Asia), 2019, vol. 38, No. 6, pp. 1-15.
Oechsle M., et al., "Texture Fields: Learning Texture Representations in Function Space," International Conference on Computer Vision (ICCV), 2019, pp. 4531-4540.
Orts-Escolano S., et al., "Holoportation: Virtual 3D Teleportation in Real-time," In Proceedings of the 29th Annual Symposium on User Interface Software and Technology, 2016, pp. 741-754.
Park J.J., et al., "DeepSDF: Learning Continuous Signed Distance Functions for Shape Representation," Computer Vision and Pattern Recognition (CVPR), 2019, pp. 165-174.

(56) References Cited

OTHER PUBLICATIONS

Penner E., et al., "Soft 3D Reconstruction for View Synthesis," ACM Transactions on Graphics, vol. 36 (6), Nov. 2017, Article 235, pp. 1-11.
Riegler G., et al., "Free View Synthesis," European Conference on Computer Vision (ECCV), 2020, pp. 623-640.
Saito S., et al., "PIFu: Pixel-Aligned Implicit Function for High-Resolution Clothed Human Digitization," International Conference on Computer Vision (ICCV), 2019, pp. 2304-2314.
Saito S, et al., "PIFuHD: Multi-Level Pixel-Aligned Implicit Function for High-Resolution 3D Human Digitization," in Proceedings of the IEEE Conference on Computer Vision and Pattern Recognition (CVPR), Apr. 1, 2020, pp. 84-93.
Schonberger J.L., et al., "Structure-from-Motion Revisited," IEEE Conference on Computer Vision and Pattern Recognition (CVPR), 2016, pp. 4104-4113.
Shih M-L., et al., "3D Photography using Context-Aware Layered Depth Inpainting," Computer Vision and Pattern Recognition (CVPR), 2020, pp. 8028-8038.
Srinivasan P.P., et al., "Pushing the Boundaries of View Extrapolation with Multiplane Images," Computer Vision and Pattern Recognition (CVPR), 2019, pp. 175-184.
Teed Z., et al., "DeepV2D: Video to Depth with Differentiable Structure from Motion," International Conference on Learning Representations (ICLR), 2020, 20 Pages.
Tewari A., et al., "State of the Art on Neural Rendering," State of The Art Report (STAR), 2020, vol. 39, No. 2, 27 Pages.
Tucker R., et al., "Single-View View Synthesis with Multiplane Images," Computer Vision and Pattern Recognition (CVPR), 2020, pp. 551-560.
Wang Z., et al., "Image Quality Assessment: From Error Visibility to Structural Similarity," IEEE Transactions on Image Processing, Apr. 4, 2004, vol. 13 (4), pp. 1-14.
Wiegand T., et al., "Overview of the H.264/AVC Video Coding Standard," IEEE Transactions on Circuits and Systems for Video Technology, 2003, vol. 13, No. 7, pp. 560-576.
Wood D.N., et al., "Surface Light Fields for 3D Photography," Proceedings of the 27th Annual Conference on Computer Graphics and Interactive Techniques, 2000, pp. 287-296.
Xian W., et al., "Space-time Neural Irradiance Fields for Free-Viewpoint Video," arXiv:2011.12950, 2020, 10 pages.
Xiao L., et al., "Neural Supersampling for Real-time Rendering," ACM Trans. Graph., vol. 39, No. 4, Jul. 8, 2020, pp. 142:1-142:12.
Yao Y., et al., "MVSNet: Depth Inference for Unstructured Multiview Stereo," European Conference on Computer Vision (ECCV), 2018, pp. 767-783.
Yariv L., et al., "Multiview Neural Surface Reconstruction by Disentangling Geometry and Appearance," Neural Information Processing Systems (NeurIPS), 2020, 11 pages.
Yu A., et al., "pixelNeRF: Neural Radiance Fields from One or Few Images," arXiv, 2020, 20 pages, https://arxiv.org/abs/2012.02190.
Yuan W., et al., "STaR: Self-supervised Tracking and Reconstruction of Rigid Objects in Motion with Neural Rendering," arXiv:2101.01602, 2020, 12 pages.
Zhang R., et al., "The Unreasonable Effectiveness of Deep Features as a Perceptual Metric," In Proceedings of the IEEE Conference on Computer Vision and Pattern Recognition, 2018, 10 pages.

\* cited by examiner

SPACE-TIME REPRESENTATION OF DYNAMIC SCENES

TECHNICAL FIELD

This disclosure generally relates to artificial reality, in particular to generating free-viewpoint videos.

BACKGROUND

Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

SUMMARY OF PARTICULAR EMBODIMENTS

Particular embodiments described herein relate to systems and methods of generating 4D representations (consisting of three spatial dimensions and one temporal dimension) of AR/VR scenes based on a series of images included in a casually captured video to represent the scene in both spatial and temporal domains. At a high level, the system solves the problem by aggregating frame-wise 2.5D representations (RGB+ depth map) into a globally consistent spatiotemporal representation from a single video. The system may address the inherent motion—appearance ambiguity using video depth supervision and may constrain the dis-occluded contents by propagating the color and volume density across time. The system may use neural radiance fields (NeRF) to create new views from arbitrary viewpoints and arbitrary times for dynamic scenes. For the training process, the system may not need direct 3D ground truth data to model the time-varying 3D geometry and the appearance of complex scenes. Instead, the system may use training samples of that are randomly selected from a training sample pool which includes training samples locations in the 3D space over time generated based on RGB images and estimated depth map data. As a result, the system may generate a free-viewpoint video rendering experience on various casual videos (e.g., by smartphones) while preserving motion and texture details for conveying a vivid sense of 3D.

As an example, the system may use a space-time neural radiance fields (NeRF) framework to build a 4D representation (x, y, z, t) for a dynamic scene. The space-time NeRF framework may include a multi-layer perceptron (MLP) which can be trained by the training samples during the training stage and can be queried at the inference stage to generate images for particular viewpoints and time to represent the dynamic scene. The space-time NeRF framework may use a continuous volume rendering method which allows the color of a pixel to be determined by integrating the radiance as modulated by the volume density along the camera ray. The training process may use multiple loss functions and constraints. The first loss function may be for multiple posed images capturing a scene from different viewpoints. This loss function may minimize the photometric loss (color values) of the ground truth images (input video frames) and the generated images. The second loss function may minimize the depth reconstruction loss to address the motion-appearance ambiguity. In particular embodiments, the changes in the scene may be explained by either motion or color changes. The system may constrain the time-varying geometry of the dynamic scene representation using per-frame scene depth of the input video. To do so, the system may define the scene depth of a ray using accumulative depth values along the ray modulated with the transmittance and the volume density.

The third loss function may be for empty space loss. Constraining the depth predicted by the model using the estimated scene depth may not sufficient to capture accurate scene geometry. This is because the predicted depth may be a weighted sum of depth values along the ray. To solve this problem, the system may constrain the empty space between the camera and the first visible scene surface by penalizing non-zero volume densities along each ray up to the point no closer than a pre-determined threshold margin. Empty-space loss combined with the depth reconstruction loss may provide geometric constraints for the representation up to and around visible scene surfaces at each frame. The fourth loss function may be for static scene loss. For the images in a video, it may be possible that a portion of dis-occluded space can be observed from a different viewpoint in a different frame. The system may constrain the MLP by propagating these partially observed contents across time by constraining the spaces surrounding the surface regions (rather than using scene flow). The system may assume every part of the world would stay static unless observed otherwise. The total loss function may include a linear combination of all four components as discussed above. To generate the training samples, the system may take the union of all sampling locations along all rays of all frames to form a sample pool (including a large number of sampling locations in the 3D space). The system may exclude all points that are closer to any observed surfaces than a threshold margin and randomly draw a fixed number of sampling locations from this pool at each training iteration and add small random jitters to each sampling location. The system may train the MLP using the randomly selected samples and the total loss function with all the constraints. Once trained, the MLP may be queried to generate AR/VR images of the scene from arbitrary viewpoints and time moments. As a result, the system can generate a free-viewpoint video rendering experience from casually captured videos (e.g., by smartphones) while preserving motion and texture details for conveying a vivid 3D sense.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1A:
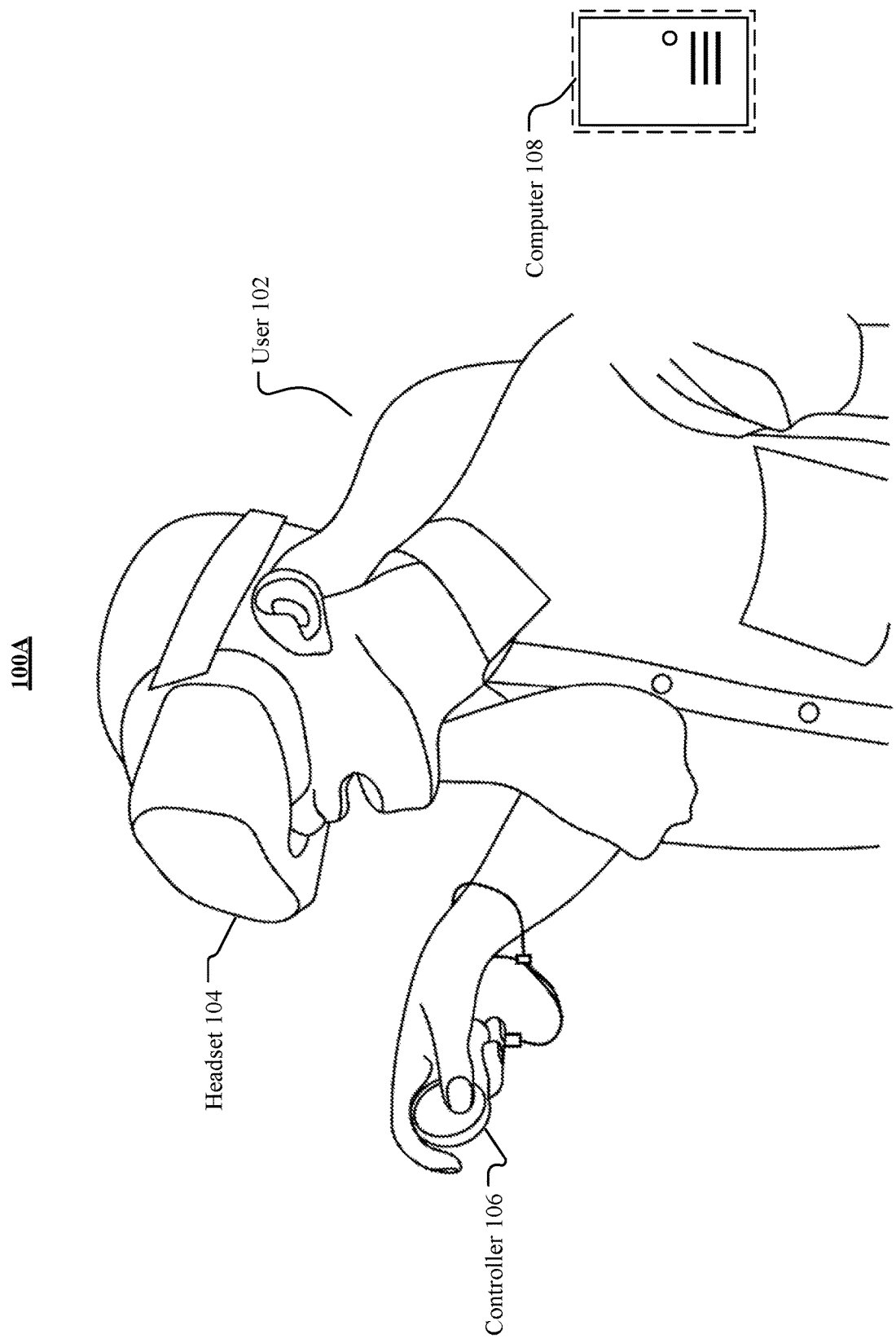
FIG. 1A illustrates an example artificial reality system.

FIG. 1A illustrates an example artificial reality system 100A. In particular embodiments, the artificial reality system 100 may comprise a headset 104, a controller 106, and a computing system 108. A user 102 may wear the headset 104 that may display visual artificial reality content to the user 102. The headset 104 may include an audio device that may provide audio artificial reality content to the user 102. The headset 104 may include one or more cameras which can capture images and videos of environments. The headset 104 may include an eye tracking system to determine the vergence distance of the user 102. The headset 104 may be referred as a head-mounted display (HDM). The controller 106 may comprise a trackpad and one or more buttons. The controller 106 may receive inputs from the user 102 and relay the inputs to the computing system 108. The controller 206 may also provide haptic feedback to the user 102. The computing system 108 may be connected to the headset 104 and the controller 106 through cables or wireless connections. The computing system 108 may control the headset 104 and the controller 106 to provide the artificial reality content to and receive inputs from the user 102. The computing system 108 may be a standalone host computer system, an on-board computer system integrated with the headset 104, a mobile device, or any other hardware platform capable of providing artificial reality content to and receiving inputs from the user 102.

Figure 1B:
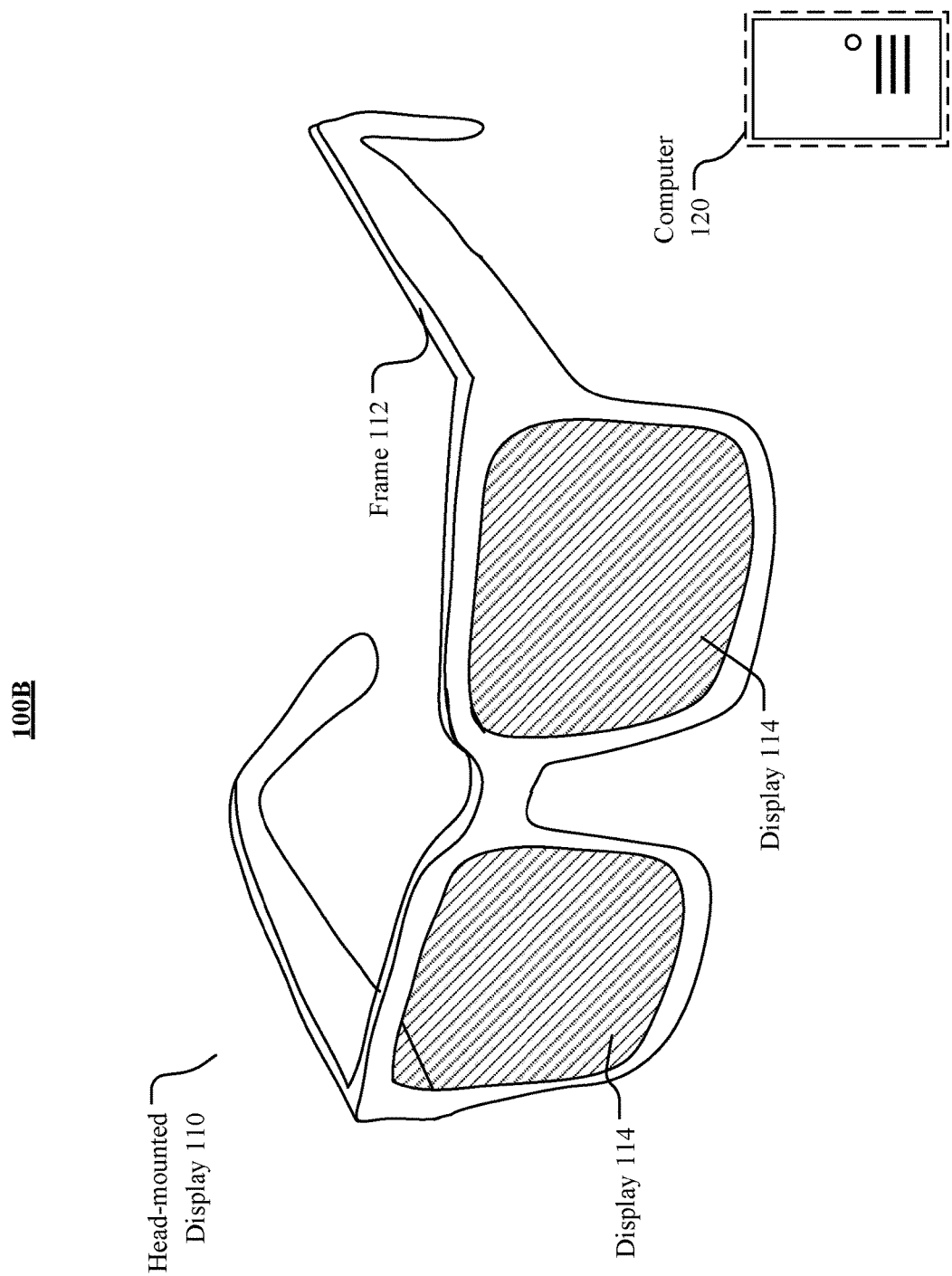
FIG. 1B illustrates an example augmented reality system.

FIG. 1B illustrates an example augmented reality system 100B. The augmented reality system 100B may include a head-mounted display (HMD) 110 (e.g., glasses) comprising a frame 112, one or more displays 114, and a computing system 120. The displays 114 may be transparent or translucent allowing a user wearing the HMD 110 to look through the displays 114 to see the real world and displaying visual artificial reality content to the user at the same time. The HMD 110 may include an audio device that may provide audio artificial reality content to users. The HMD 110 may include one or more cameras which can capture images and videos of environments. The HMD 110 may include an eye tracking system to track the vergence movement of the user wearing the HMD 110. The augmented reality system 100B may further include a controller comprising a trackpad and one or more buttons. The controller may receive inputs from users and relay the inputs to the computing system 120. The controller may also provide haptic feedback to users. The computing system 120 may be connected to the HMD 110 and the controller through cables or wireless connections. The computing system 120 may control the HMD 110 and the controller to provide the augmented reality content to and receive inputs from users. The computing system 120 may be a standalone host computer system, an on-board computer system integrated with the HMD 110, a mobile device, or any other hardware platform capable of providing artificial reality content to and receiving inputs from users.

Figure 1C:
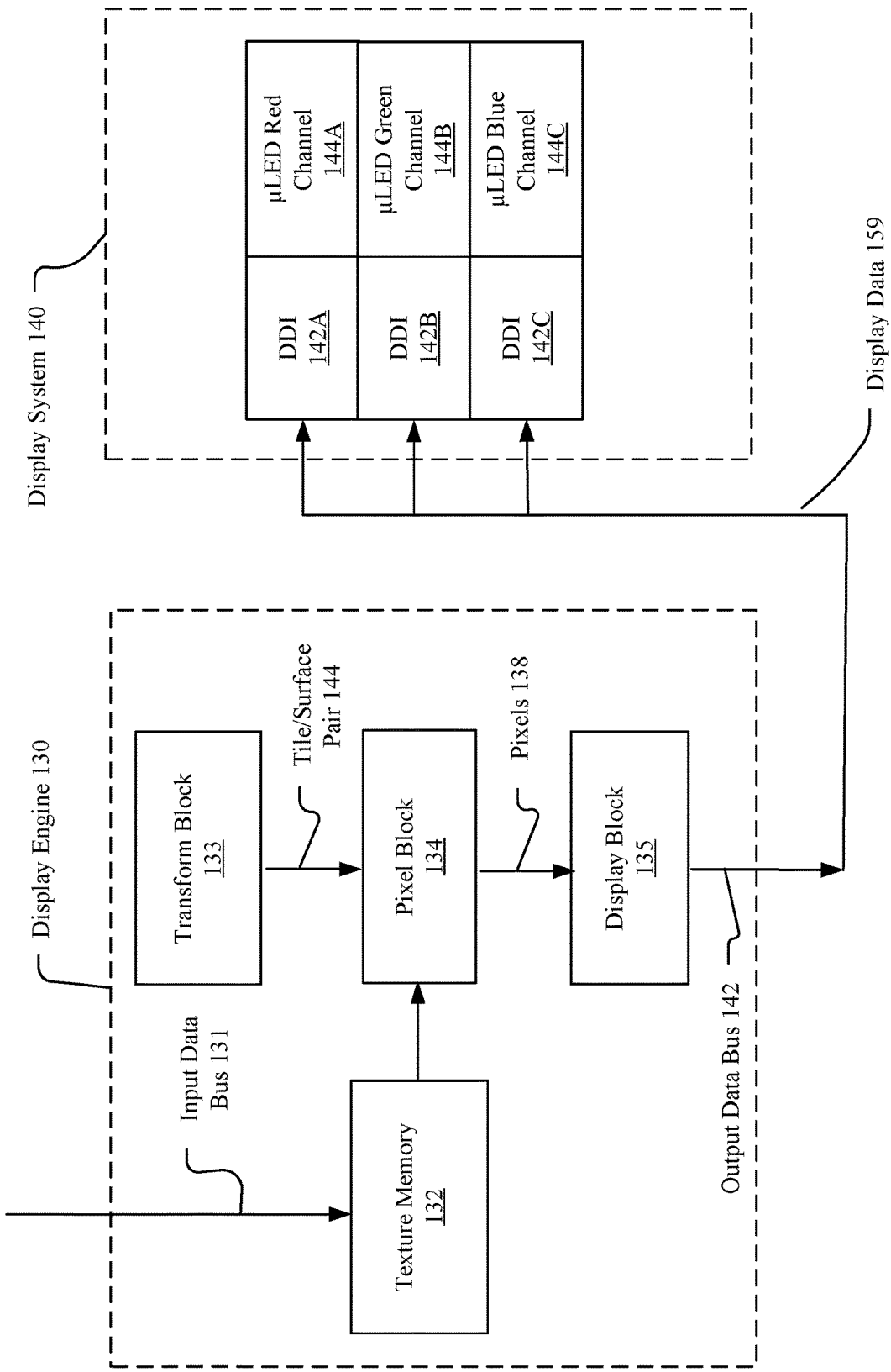
FIG. 1C illustrates an example architecture of a display engine.

FIG. 1C illustrates an example architecture 100C of a display engine 130. In particular embodiments, the processes and methods as described in this disclosure may be embodied or implemented within a display engine 130 (e.g., in the display block 135). The display engine 130 may include, for example, but is not limited to, a texture memory 132, a transform block 133, a pixel block 134, a display block 135, input data bus 131, output data bus 142, etc. In particular embodiments, the display engine 130 may include one or more graphic pipelines for generating images to be rendered on the display. For example, the display engine may use the graphic pipeline(s) to generate a series of subframe images based on a mainframe image and a viewpoint or view angle of the user as measured by one or more eye tracking sensors. The mainframe image may be generated or/and loaded in to the system at a mainframe rate of 30-90 Hz and the subframe rate may be generated at a subframe rate of 1-2 kHz. In particular embodiments, the display engine 130 may include two graphic pipelines for the user's left and right eyes. One of the graphic pipelines may include or may be implemented on the texture memory 132, the transform block 133, the pixel block 134, the display block 135, etc. The display engine 130 may include another set of transform block, pixel block, and display block for the other graphic pipeline. The graphic pipeline(s) may be controlled by a controller or control block (not shown) of the display engine 130. In particular embodiments, the texture memory 132 may be included within the control block or may be a memory unit external to the control block but local to the display engine 130. One or more of the components of the display engine 130 may be configured to communicate via a high-speed bus, shared memory, or any other suitable methods. This communication may include transmission of data as well as control signals, interrupts or/and other instructions. For example, the texture memory 132 may be configured to receive image data through the input data bus 211. As another example, the display block 135 may send the pixel values to the display system 140 through the output data bus 142. In particular embodiments, the display system 140 may include three color channels (e.g., 114A, 114B, 114C) with respective display driver ICs (DDIs) of 142A, 142B, and 143B. In particular embodiments, the display system 140 may include, for example, but is not limited to, light-emitting diode (LED) displays, organic light-emitting diode (OLED) displays, active matrix organic light-emitting diode (AMLED) displays, liquid crystal display (LCD), micro light-emitting diode (μLED) display, electroluminescent displays (ELDs), or any suitable displays.

In particular embodiments, the display engine 130 may include a controller block (not shown). The control block may receive data and control packages such as position data and surface information from controllers external to the display engine 130 though one or more data buses. For example, the control block may receive input stream data from a body wearable computing system. The input data stream may include a series of mainframe images generated at a mainframe rate of 30-90 Hz. The input stream data including the mainframe images may be converted to the required format and stored into the texture memory 132. In particular embodiments, the control block may receive input from the body wearable computing system and initialize the graphic pipelines in the display engine to prepare and finalize the image data for rendering on the display. The data and control packets may include information related to, for example, one or more surfaces including texel data, position data, and additional rendering instructions. The control block may distribute data as needed to one or more other blocks of the display engine 130. The control block may initiate the graphic pipelines for processing one or more frames to be displayed. In particular embodiments, the graphic pipelines for the two eye display systems may each include a control block or share the same control block.

In particular embodiments, the transform block 133 may determine initial visibility information for surfaces to be displayed in the artificial reality scene. In general, the transform block 133 may cast rays from pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye tracking sensors, and/or any suitable tracking/localization algorithms, such as simultaneous localization and mapping (SLAM)) into the artificial scene where surfaces are positioned and may produce tile/surface pairs 144 to send to the pixel block 134. In particular embodiments, the transform block 133 may include a four-stage pipeline as follows. A ray caster may issue ray bundles corresponding to arrays of one or more aligned pixels, referred to as tiles (e.g., each tile may include 16×16 aligned pixels). The ray bundles may be warped, before entering the artificial reality scene, according to one or more distortion meshes. The distortion meshes may be configured to correct geometric distortion effects stemming from, at least, the eye display systems the headset system. The transform block 133 may determine whether each ray bundle intersects with surfaces in the scene by comparing a bounding box of each tile to bounding boxes for the surfaces. If a ray bundle does not intersect with an object, it may be discarded. After the tile-surface intersections are detected, the corresponding tile/surface pairs may be passed to the pixel block 134.

In particular embodiments, the pixel block 134 may determine color values or grayscale values for the pixels based on the tile-surface pairs. The color values for each pixel may be sampled from the texel data of surfaces received and stored in texture memory 132. The pixel block 134 may receive tile-surface pairs from the transform block 133 and may schedule bilinear filtering using one or more filer blocks. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation). In particular embodiments, the pixel block 134 may process the red, green, and blue color components separately for each pixel. In particular embodiments, the display may include two pixel blocks for the two eye display systems. The two pixel blocks of the two eye display systems may work independently and in parallel with each other. The pixel block 134 may then output its color determinations (e.g., pixels 138) to the display block 135. In particular embodiments, the pixel block 134 may composite two or more surfaces into one surface to when the two or more surfaces have overlapping areas. A composed surface may need less computational resources (e.g., computational units, memory, power, etc.) for the resampling process.

In particular embodiments, the display block 135 may receive pixel color values from the pixel block 134, covert the format of the data to be more suitable for the scanline output of the display, apply one or more brightness corrections to the pixel color values, and prepare the pixel color values for output to the display. In particular embodiments, the display block 135 may each include a row buffer and may process and store the pixel data received from the pixel block 134. The pixel data may be organized in quads (e.g., 2×2 pixels per quad) and tiles (e.g., 16×16 pixels per tile). The display block 135 may convert tile-order pixel color values generated by the pixel block 134 into scanline or row-order data, which may be required by the physical displays. The brightness corrections may include any required brightness correction, gamma mapping, and dithering. The display block 135 may output the corrected pixel color values directly to the driver of the physical display (e.g., pupil display) or may output the pixel values to a block external to the display engine 130 in a variety of formats. For example, the eye display systems of the headset system may include additional hardware or software to further customize backend color processing, to support a wider interface to the display, or to optimize display speed or fidelity.

In particular embodiments, the dithering methods and processes (e.g., spatial dithering method, temporal dithering methods, and spatio-temporal methods) as described in this disclosure may be embodied or implemented in the display block 135 of the display engine 130. In particular embodiments, the display block 135 may include a model-based dithering algorithm or a dithering model for each color channel and send the dithered results of the respective color channels to the respective display driver ICs (DDIs) (e.g., 142A, 142B, 142C) of display system 140. In particular embodiments, before sending the pixel values to the respective display driver ICs (e.g., 142A, 142B, 142C), the display block 135 may further include one or more algorithms for correcting, for example, pixel non-uniformity, LED non-ideality, waveguide non-uniformity, display defects (e.g., dead pixels), display degradation, etc. U.S. Patent Application Ser. No. 16/998,860, entitled "Display Degradation Compensation," first named inventor "Edward Buckley," filed on 20 Aug. 2020, which discloses example systems, methods, and processes for display degradation compensation, is incorporated herein by reference.

In particular embodiments, graphics applications (e.g., games, maps, content-providing apps, etc.) may build a scene graph, which is used together with a given view position and point in time to generate primitives to render on a GPU or display engine. The scene graph may define the logical and/or spatial relationship between objects in the scene. In particular embodiments, the display engine 130 may also generate and store a scene graph that is a simplified form of the full application scene graph. The simplified scene graph may be used to specify the logical and/or spatial relationships between surfaces (e.g., the primitives rendered by the display engine 130, such as quadrilaterals or contours, defined in 3D space, that have corresponding textures generated based on the mainframe rendered by the application). Storing a scene graph allows the display engine 130 to render the scene to multiple display frames and to adjust each element in the scene graph for the current viewpoint (e.g., head position), the current object positions (e.g., they could be moving relative to each other) and other factors that change per display frame. In addition, based on the scene graph, the display engine 130 may also adjust for the geometric and color distortion introduced by the display subsystem and then composite the objects together to generate a frame. Storing a scene graph allows the display engine 130 to approximate the result of doing a full render at the desired high frame rate, while actually running the GPU or display engine 130 at a significantly lower rate.

Figure 1D:
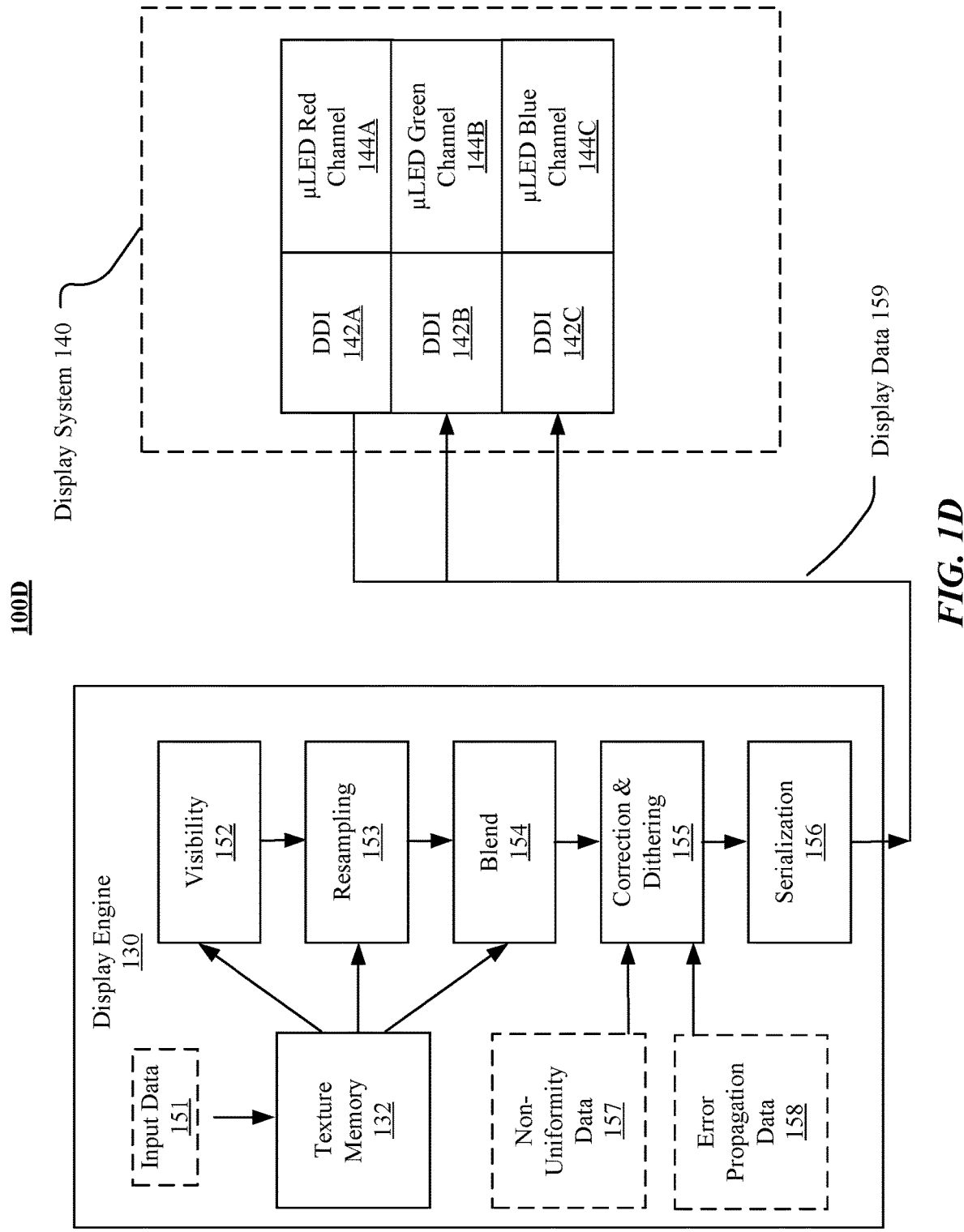
FIG. 1D illustrates an example graphic pipeline of the display engine for generating display image data.

FIG. 1D illustrates an example graphic pipeline 100D of the display engine 130 for generating display image data. In particular embodiments, the graphic pipeline 100D may include a visibility step 152, where the display engine 130 may determine the visibility of one or more surfaces received from the body wearable computing system. The visibility step 152 may be performed by the transform block (e.g., 2133 in FIG. 1C) of the display engine 130. The display engine 130 may receive (e.g., by a control block or a controller) input data 151 from the body-wearable computing system. The input data 151 may include one or more surfaces, texel data, position data, RGB data, and rendering instructions from the body wearable computing system. The input data 151 may include mainframe images with 30-90 frames per second (FPS). The main frame image may have color depth of, for example, 24 bits per pixel. The display engine 130 may process and save the received input data 151 in the texel memory 132. The received data may be passed to the transform block 133 which may determine the visibility information for surfaces to be displayed. The transform block 133 may cast rays for pixel locations on the screen and produce filter commands (e.g., filtering based on bilinear or other types of interpolation techniques) to send to the pixel block 134. The transform block 133 may perform ray casting from the current viewpoint of the user (e.g., determined using the headset's inertial measurement units, eye trackers, and/or any suitable tracking/localization algorithms, such as simultaneous localization and mapping (SLAM)) into the artificial scene where surfaces are positioned and produce surface-tile pairs to send to the pixel block 134.

In particular embodiments, the graphic pipeline 100D may include a resampling step 153, where the display engine 130 may determine the color values from the tile-surfaces pairs to produce pixel color values. The resampling step 153 may be performed by the pixel block 134 in FIG. 1C of the display engine 130. The pixel block 134 may receive tile-surface pairs from the transform block 133 and may schedule bilinear filtering. For each tile-surface pair, the pixel block 134 may sample color information for the pixels within the tile using color values corresponding to where the projected tile intersects the surface. The pixel block 134 may determine pixel values based on the retrieved texels (e.g., using bilinear interpolation) and output the determined pixel values to the respective display block 135.

In particular embodiments, the graphic pipeline 100D may include a bend step 154, a correction and dithering step 155, a serialization step 156, etc. In particular embodiments, the bend step, correction and dithering step, and serialization steps of 154, 155, and 156 may be performed by the display block (e.g., 135 in FIG. 1C) of the display engine 130. The display engine 130 may blend the display content for display content rendering, apply one or more brightness corrections to the pixel color values, perform one or more dithering algorithms for dithering the quantization errors both spatially and temporally, serialize the pixel values for scanline output for the physical display, and generate the display data 159 suitable for the display system 140. The display engine 130 may send the display data 159 to the display system 140. In particular embodiments, the display system 140 may include three display driver ICs (e.g., 142A, 142B, 142C) for the pixels of the three color channels of RGB (e.g., 144A, 144B, 144C).

Traditional methods for generating 3D representations of AR/VR scenes have some limitations. For example, each 3D representation is generated based on a single image of a scene and thus the method is limited to static scenes without moving objects. Such per-frame processing methods often lead to temporal flickers. The core problem lies in the use of a frame-wise representation (e.g., depth maps associated with the input images), and therefore suffer from issues ranging from temporal inconsistency to high redundancy and thus excessive storage requirements and data transfer bandwidth. Furthermore, the 3D scene representation generated in this way may only represent the scene at a particular time moment and cannot represent how the scene would change overtime. In addition, the existing methods often require laborious multi-camera setup, special hardware, or synchronous video captures from multiple viewpoints to create 3D ground truth training data to generate representation and cannot generate a dynamic representation of a complex dynamic scene from a single video.

To solve this problem, particular embodiment of the system may use monocular video depth estimation methods to determine the depth map for each frame included in the video capturing a dynamic scene, and aggregate the entire spatiotemporal aspects of the dynamic scene into a single global representation by fusing multiple depth maps into a single and global representation of the dynamic scene. For example, the system may use a space-time neural radiance field (NeRF) framework to build a space-time representation (e.g., a 6D representation of (x, y, z, θ, φ, t) or a 4D representation of (x, y, z, t) precluding view dependency) for the dynamic scene. The space-time representation may be a continuous representation of a scene that can provide any resolution based on the system needs. The space-time NeRF framework may include a multi-layer perceptron (MLP) which can be trained by the training samples during the training stage and can be queried at the inference stage to generate images for particular viewpoints and time to represent the dynamic scene. The space-time NeRF framework may use a continuous volume rendering method which allows the color a pixel to be determined by integrating the radiance modulated by the volume density along the camera ray. The training process may use multiple loss functions and constraints. The first loss function may be for multiple posed images capturing a static scene from different viewpoints. This loss function minimizes the photometric loss (color values) of the ground truth images and the generated images. The second loss function may minimize the depth reconstruction loss to address the motion-appearance ambiguity (e.g., objects appear or disappear in different frames). The system may constrain the time-varying geometry of the dynamic scene representation using per-frame scene depth of the input video. To do so, the system may define the scene depth of a ray using accumulative depth values along the ray modulated with the transmittance and the volume density.

The third loss function may be for empty space loss. The system may constrain the empty space between the camera and the first visible scene surface by penalizing non-zero volume densities along each ray up to the point no closer than a pre-determined threshold margin. Empty-space loss combined with the depth reconstruction loss may provide geometric constraints for the representation up to and around visible scene surfaces at each frame. The fourth loss function may be for static scene loss. For the images in a video, a portion of dis-occluded space may be observed from a different viewpoint in a different frame. The system may constrain the MLP by propagating these partially observed contents across time by constraining the spaces surrounding the surface regions (rather than using scene flow). The system may assume every part of the world would stay static unless observed otherwise. The total loss function incudes a linear combination of all four components as discussed above. To generate the training samples, the system may take the union of all sampling locations along all rays of all frames to form a sample pool (including a large number of sampling locations in the 3D space). The system may exclude all points that are closer to any observed surfaces than a threshold margin and randomly draw a fixed number of sampling locations from this pool at each training iteration and add small random jitters to each sampling location. The system may train the MLP using the randomly selected samples and the total loss function with all the constraints. Once trained, the MLP may be queried to generate AR/VR images of the scene from arbitrary viewpoints and time moments. As a result, the system can generate a free-viewpoint video rendering experience from casually captured videos (e.g., by smartphones) while preserving motion and texture details for conveying a vivid 3D sense.

Particular embodiments of the system may use a single video to generate a space-time representation that is a globally consistent and dynamic to represent a scene that can later be rendered from a novel viewpoint. The system may generate the space-time representation from a casually captured single video from everyday devices such as smartphones, without the assistance of multi-camera rigs or other dedicated hardware (which are typically not accessible to casual users). The space-time representation of the scene may be continuous representation of the dynamic scene and may be used to generate image of the scene from any given view directions or time. The system may render photorealistic views with correctly filled dis-occluded contents compared to view synthesis with per-frame depth-based warping. The system may fill in the dis-occluded content implicitly in the 3D space and may produce significantly fewer artifacts than the traditional methods. Furthermore, the method may not assume a fixed, canonical 3D model as in existing dynamic 3D reconstruction methods and, therefore, can naturally handle an entire dynamic scene (as opposed to only individual objects). In addition, the system may use neural implicit representations to jointly models time-varying geometry and appearance.

Under the framework of the neural radiance field (NeRF), the system may represent the radiance as c=(r, g, b) and differential volume density $\sigma$ at a 3D location x=(x, y, z) of a scene observed from a viewing direction d=($\theta$, $\phi$) as a continuous multi-variate function using a multi-layer perceptron (MLP): $F_{NeRF}$: (x, d)→(c, $\sigma$). While two angles ($\theta$, $\phi$) are sufficient to describe a direction in 3D, it is often more convenient to use a 3D vector d=($d_x$, $d_y$, $d_z$); henceforth we use it. The color of a pixel may be rendered by integrating the radiance modulated by the volume density along the camera ray r(s) =o +sd, shot from the camera center through the center of the pixel:

$$C(r) = \int_{s_a}^{s_f} T(s)\sigma(r(s))c(r(s), d)ds \qquad (1)$$

where, T(s) is the accumulated transmittance along the ray r up to s:

$$T(s) = \exp\left(-\int_{s_a}^{s} \sigma(r(p))dp\right) \qquad (2)$$

The MLP may be trained using multiple posed images, capturing a static scene from different viewpoints. Specifically, the system may minimize the photometric loss that compares the rendering through a ray r with the corresponding ground truth color from an input image:

$$\mathcal{L}_{NeRF} = \sum_{r \in \mathcal{R}} \|\hat{C}(r) - C(r)\|_2^2 \qquad (3)$$

where, R denotes a set of rays; C(r) and $\hat{C}$(r) denote the ground truth and the estimated color, respectively. In particular embodiments, the neural radiance field (NeRF) may be a neural irradiance field (NeIF) and it is notable that, the methods, processes, principles, and system described in this disclosure may be applicable to both the neural irradiance field (NeIF) and the neural radiance field (NeRF) in general. In particular embodiments the ray direction d is not used to evaluate the color and volume density at 3D positions along a ray r(s). Thus, the neural irradiance is defined as: $F_{NeIF}$: x→(c, $\sigma$) and the color of the ray is computed as:

$$C(r) = \int_{s_n}^{s_f} T(s)\sigma(r(s))c(r(s))ds$$

In the following, the direction d may be omitted and the term NeRF may be used for simplicity.

In particular embodiments, the continuous volume rendering of the pixel colors may be approximated by numerical quadrature, for example, by computing the color using a finite number of sampled 3D points along a ray and calculating the summation of the radiances, weighted by the discrete transmittance. As this weighted summation process is differentiable, the gradient may propagate backward for optimizing the MLP. In particular embodiments, the system may perform the sampling in two steps. First, a ray may be sampled uniformly in s. In particular embodiments, a ray may be sampled with respect to the approximate transmittance so that more samples are used around surfaces in the scene. In other words, the ray portion that is associated with a higher transmittance (lower volume density) may have less sampling points than the ray portion that is within a margin range to a surface which has a lower transmittance (higher volume density). The two groups of samples may be evaluated in separate coarse and fine networks, and both may be used to measure the photometric loss (e.g., RGB color values).

In particular embodiments, the system may represent a 4D space-time radiance field as a function that maps a spatiotemporal location (x, t) to the emitted color and volume density, F: (x, t)→(c, σ), where x represents the 3D location of (x, y, z), t represents time, c represents the emitted color, σ represents the volume density. The input video for generating the 4D space-time radiance field may be represented as a stream of RGB-D images, $I_t$: u→(c, d) at discrete time steps t ∈ T ={1, 2, ..., $N_f$}, where u =(u, v) is 2D pixel coordinate and d represents the associated camera view direction determined based on camera calibration $P_t$. A ray r at time t may be determined by a pixel location u and the camera calibration $P_t$. The ray may march from the camera center through the center of pixel denoted by u. Additionally, the system may parameterize a ray such that the parameter s denotes the scene depth. This may be achieved by setting the directional vector d such that its projection onto the principal ray has a unit norm in the camera space.

In particular embodiments, the system may use color reconstruction loss function to constrain the training process. The color reconstruction loss function may be for multiple posed images capturing a static scene from different viewpoints. This loss function may minimize the photometric loss (color values) of the ground truth images and the generated images. To learn the implicit function F from the input video I, the system may first constrain the representation F such that it reproduces the original video I when rendered from the original viewpoint for each frame. Specifically, the system may penalize the difference between the volume-rendered image at each time t and the corresponding input image $I_t$. The reconstruction loss of the original NeRF may be represented by the following equation:

$$\mathcal{L}_{color} = \sum_{(r,t)\in \mathcal{R}} \left\| \hat{C}(r, t) - C(r, t) \right\|_2^2 \quad (4)$$

where, R is a batch of rays, each of which is associated with a time t. For the dynamic scenes, the system may reconstruct the time-varying scene geometry at every time t. However, at any point in time, a single video may contain only one observation of the scene from a particular view direction, rendering the estimation of scene geometry severely underconstrained. In other words, the 3D geometry of a scene can be represented in numerous (infinitely possible) ways since varying geometry can be explained with the varying appearance and vice versa. For example, any input video can be reconstructed with a "a flat TV" solution (i.e., with a planar geometry with each frame texture-mapped). Thus, the color reconstruction loss may provide the ground for accurate reconstruction when the learned representation is rendered from the same camera trajectory of the input, lacking machinery that drives learning correct geometry. Incorrect geometry would lead to artifacts as soon as the view direction starts to deviate from the original video's camera trajectory. In particular embodiments, the system may use the depth reconstruction loss to solve this problem, as discussed in the following sections.

In particular embodiments, the system may use depth reconstruction loss function to constrain the training process and minimize the depth reconstruction loss to address the motion-appearance ambiguity (e.g., objects may have either moved or changed their colors, but these two inherently different types of dynamism may look identical and be indistinguishable from certain viewers.). The system may constrain the time-varying geometry of the dynamic scene representation using per-frame scene depth of the input video. To do so, the system may define the scene depth of a ray using accumulative depth values along the ray modulated with the transmittance and the volume density. In particular embodiments, the depth reconstruction loss function may measure the difference in the inverse depth space. If only depth values are measured, the farther parts of the scene may have higher impact, because their depth values are larger (e.g., 1 km). The system may need near parts to have large impact instead. Thus, by taking inverse depth value and measure the loss, the system may penalize the high depth value range less severely to allow the part that is closer to the camera to have more impact.

In particular embodiments, the system may resolve the motion-appearance ambiguity by constraining the time-varying geometry of the dynamic scene representation using the per-frame scene depth of the input video (e.g., estimated from video depth estimated methods). The system may estimate the scene depth from the learned volume density of the scene and measure its difference from the input depth $d_t$. In particular embodiments, the system may measure the distance where the accumulated transmittance T becomes less than a certain threshold. Such an approach may involve heuristics and hard decisions. In particular embodiments, the system may accumulate depth values along the ray modulated both with the transmittance and volume density, similarly to the depth composition in layered scene representations. In particular embodiments, the depth reconstruction loss function may be represented by the following equation:

$$\mathcal{L}_{depth} = \sum_{(r,t)\in \mathcal{R}} \left\| \frac{1}{\hat{D}(r, t)} - \frac{1}{D(r, t)} \right\|_2^2 \quad (5)$$

where, the integrated sample depth values along the ray can be expressed as following:

$$\hat{D}(r, t) = \int_{s_n}^{s_f} T(s, t)\sigma(r(s), t)s \, ds \quad (6)$$

In particular embodiments, constraining the depth predicted by the model using the estimated scene depth may be not sufficient to capture accurate scene geometry because the predicted depth may be, in essence, a weighted sum of depth values along the ray. Consequently, the system may have haze-like visual artifacts when rendering at novel view directions. In particular embodiments, the system may use a loss function for empty space loss to constrain the training process. The system may constrain the empty space between the camera and the first visible scene surface by penalizing non-zero volume densities along each ray up to the point no closer than a pre-determined threshold margin. Empty-space loss combined with the depth reconstruction loss may provide geometric constraints for the representation up to and around visible scene surfaces at each frame. For the empty space loss, the system may use volume rendering to have a sharp depth map to localize the depth value close to the surface. The system may achieve this by using a function that is approximately a step function of volume density ideally. The system may penalize the empty space up to the surface, to be very small (close to zero within a threshold range) so that the space close to the camera up to the surface may be close to transparent.

In particular embodiments, the system may use an empty-space constraint to solve this problem by applying constraints to empty space between the camera and the first visible scene surface. In particular embodiments, the system may penalize non-zero volume densities measured along each ray up to the point no closer than a small margin $e=0.05 \cdot (s_f-s_n)$ to the scene depth for each ray:

$$\mathcal{L}_{empty} = \sum_{(r,t)\in\mathcal{R}} \int_{s_n}^{d_t(u)-\varepsilon} \sigma(r(s), t)ds \qquad (7)$$

where, u denotes the pixel coordinates where r intersects with the image plane at t, $d_t(u)$ denotes the scene depth for the pixel u at time t. In particular embodiments, the empty-space loss combined with the depth reconstruction loss may provide geometric constraints for the representation up to and around visible scene surfaces at each frame. As a result, the learned representations may produce geometrically correct novel view synthesis.

In particular embodiments, the system may use a static scene loss function to constrain the training process. In particular embodiments, a large portion of spaces may be hidden from the input frame's viewpoint at any given time. When the hidden portion is not constrained, the MLP may not have the 3D positions and time as input queries during training. As a result, when these unconstrained spaces are disoccluded due to viewpoint changes, the system may be prone to have artifacts. However, there may be a high chance that a portion of disoccluded spaces is observed from a different viewpoint at another time of the video frame. For the images in a video, a portion of dis-occluded space may be observed from a different viewpoint in a different frame. The system may constrain the MLP by propagating these partially observed contents across time by constraining the spaces surrounding the surface regions (rather than using scene flow). The system may assume every part of the world would stay static unless observed otherwise. In particular embodiments, the system may constrain the MLP by propagating these partially observed contents across time. However, instead of explicitly correlating surfaces over time (e.g., using the scene flow), the system may constrain the spaces surrounding the surface regions. This may allow the system to avoid misalignment of scene surfaces due to unreliable geometry estimations or other image aberrations commonly seen in captured videos such as exposure or color variations.

In particular embodiments, the system may use the static scene loss to process the part that is not seen from any of the viewpoints. The system may assume the scene as seen by camera is static. For example, when the camera moves away from a portion of scene, the system may have no observation on that part of the scene, and anything can happen later in that part. For that part, the system may assume it is static and unchanged in time to make the scene to stabilize over time. When the viewpoint is changed and the system sees this part again, this part may be stabilized to make the rendering consistence over time and filled with meaningful content. To achieve this, the system may train the network using the ground truth data so that the MLP can reproduce the ground truth. For example, for the input image at $t_0$, the system may know where the surface is located form the depth map. The system may randomly query the time that is not zero, and randomly query the sample positions. In other words, when the camera moves from left to right generating a series of images, the system may take the area that are actually seen, randomly sample the space and time position within the collection, randomly draw 3D coordinates that happen to be within the volume, randomly sample the time t, then, another time t1, to draw the 3D coordinates. The system may first check if the sample points are close to surface areas or are on a moving object, which will not be constrained because they are not static part.

In particular embodiments, the system may randomly some 3D positions at one time and another time to determine whether the output color values are the same. If the MLP provides the same color values, it may indicate that nothing chanced in the scene. The system may not constrain the part that that are known to be dynamical but only constrain the static party. The system may not constrain the area falling within a margin range to the surfaces. If something change from input view, the system may not constrain it. To determine the time consistency, the system may check the color value outputs corresponding to different time moment to determine whether they are sufficiently close to each other.

In particular embodiments, the system may assume, on unobserved spaces, every part of the world should stay static unless observed otherwise. The system may use this assumption to prevent the part of spaces that are not observed from going entirely unconstrained. The static scene constraint may encourage the shared color and volume density at the same spatial location x between two distinct times t and t' as following:

$$\mathcal{L}_{static} = \sum_{(x,t)\in\mathcal{X}} \|F(x, t) - F(x, t')\|_2^2 \qquad (8)$$

where both (x, t) and (x, t') are not close to any visible surfaces, and $\chi$ denotes a set of sampling locations where the loss is measured.

Figure 2A:
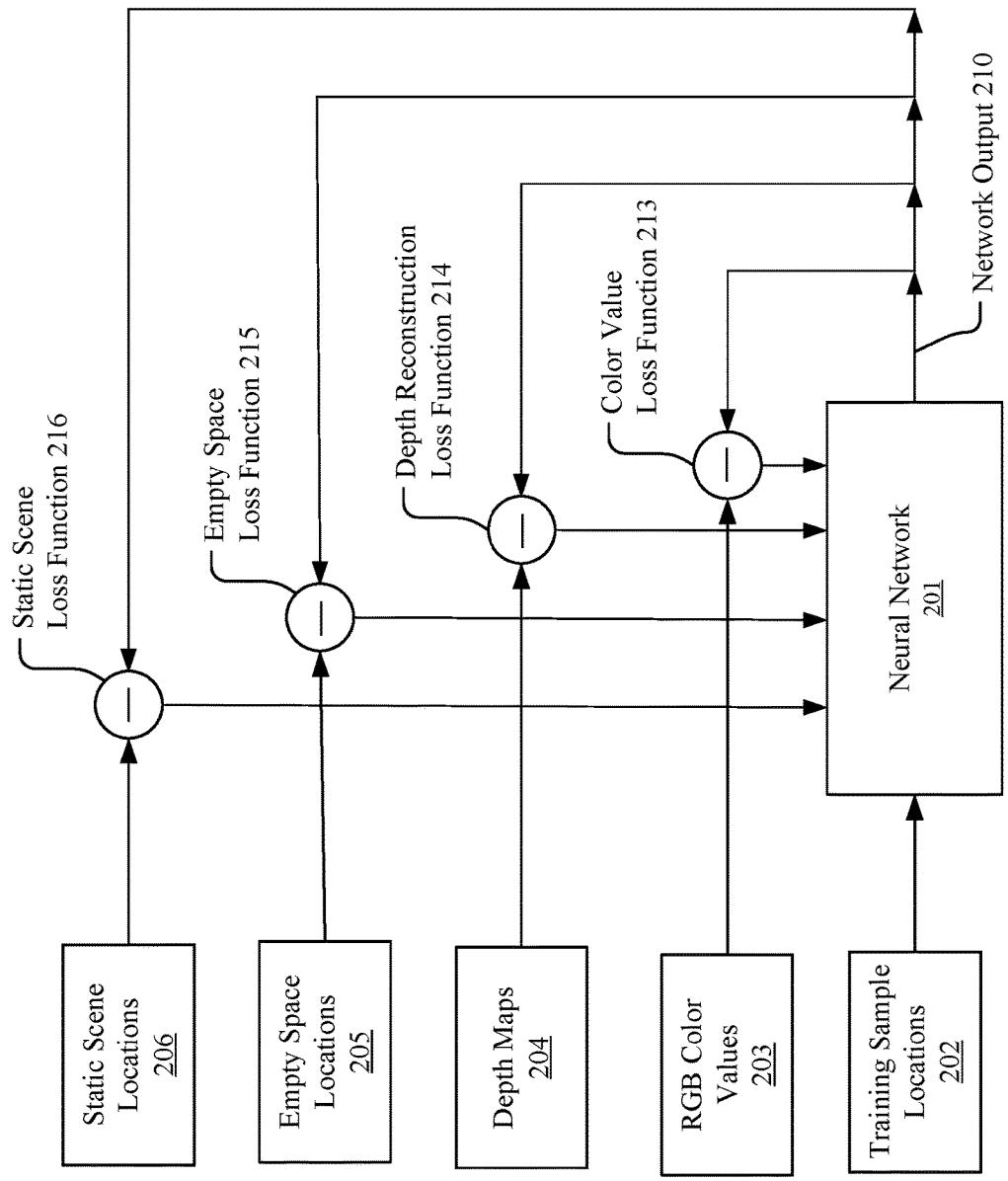
FIG. 2A illustrates an example training process of a neural network to generate a space-time representation of a scene.

FIG. 2A illustrates an example training process 200A of a neural network 201 to generate a space-time representation of a scene. In particular embodiments, the total loss function may include a linear combination, a weighted linear combination, or any suitable combination of all four loss functions as discussed above. To generate the training sample locations 202, the system may take the union of all sampling locations along all rays of all frames to form a sample pool (including a large number of sampling locations in the 3D space). The system may exclude all points that are closer to any observed surfaces than a threshold margin and randomly draw a fixed number of sampling locations from this pool at each training iteration and add small random jitters to each sampling location. During the training process, the system may feed the randomly selected sample locations 202 to the neural network 201 (e.g., MLP) which may generate the output data including the RGB color values, the depths, the empty space locations, the static scene locations. Then, the system may use the color value loss function 213 to compare the network output to the ground truth RGB color values 203, use the depth reconstruction loss function 214 to compare the ground truth depth values from the depth maps 304, use the empty-space loss function 215 to compare toe the ground truth empty space locations 205, and use the static scene loss function 216 to compare to the ground truth static scene locations 206. All comparison results may be fed back to the neural network 201 to further adjust the network parameters to minimize the corresponding loss metrics.

Figure 2B:
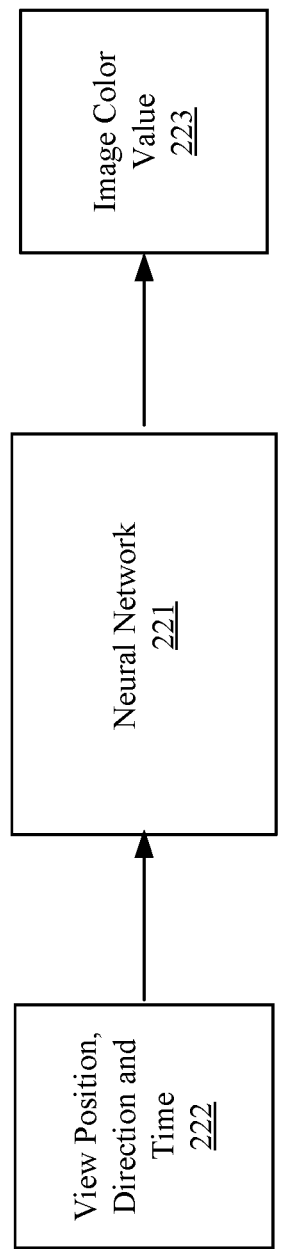
FIG. 2B illustrates an example process of using a trained neural network to determine color values for an image of the scene corresponding to an arbitrary view direction and time.

FIG. 2B illustrates an example process of using a trained neural network to determine color values for an image of the scene corresponding to an arbitrary view direction and time. Once the MLP was trained, the MLP may be queried to generate AR/VR images of the scene from arbitrary viewpoints and time moments. For example, the system may feed the query input data including the view positions, the view directions, and the time 222 to the trained neural network 221 to determine the corresponding image color values 223 for the image to be rendered to the user. As a result, the system can generate a free-viewpoint video rendering experience from casually captured videos (e.g., by smartphones) while preserving motion and texture details for conveying a vivid 3D sense.

As an example and not by way of limitation, the system may use a total loss for training the space-time representation using a linear combination of all losses including color reconstruction loss, depth reconstruction loss, empty-space loss, and static scene loss, shown as following:

$$\mathcal{L} = \mathcal{L}_{color} + \alpha \mathcal{L}_{depth} + \beta \mathcal{L}_{empty} + \gamma \mathcal{L}_{static} \qquad (9)$$

In particular embodiments, the system may use hierarchical volume sampling as in the NeRF framework and simultaneously train both the coarse and fine networks. The system may apply all losses to supervise the predictions from both networks. The system may calculate all the losses except the static scene loss on a batch of $N_r=1024$ rays that are randomly drawn from an input frame It without replacement. The system may randomly choose $N_s=1024$ from $\chi$ at each step (also without replacement) for the static scene loss. The system may normalize the time t such that $T=[-1,1]$ and apply the positional encoding with four frequency bands. In particular embodiments, the system may apply positional encoding to spatial positions x. In particular embodiments, the system may do not use the normalized device coordinates. The system may sample each ray uniformly in inverse depth. In particular embodiments, the system may fix the weights for losses as $\alpha=1$, $\beta=100$, and $\gamma=10$ and set the depth range $z_n$ and $z_f$ as the global minimum and maximum of all frames' depth values. In particular embodiments, the system may use an MLP architecture and train the models using various combinations of the four losses with the same hyperparameters. The system may use the Adam optimizer with momentum parameters $\beta1=0.9$ and $\beta2=0.999$ and a learning rate of 0.0005 and may train the MLP for 800 k iterations.

Figure 3:
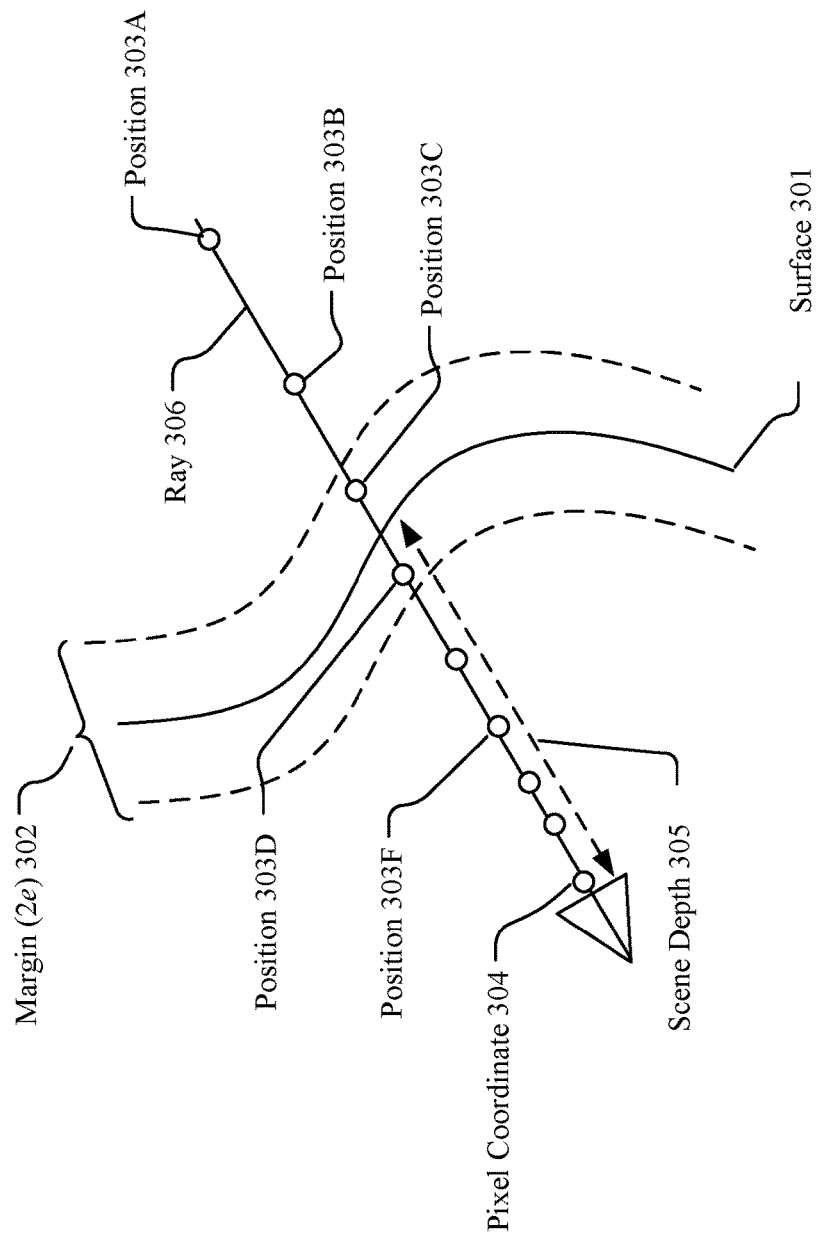
FIG. 3 illustrates an example empty-space constraint and an example static scene constraint associated with a surface of the scene.

FIG. 3 illustrates an example empty-space constraint and an example static scene constraint associated with a surface of the scene. In particular embodiments, the system may cast a ray 306 from a particular view position 303A along a particular view direction toward the pixel coordinate 304. The system may use the empty-space loss to constrain the 3D locations falling within empty space (e.g., 303A, 303B) and use the static scene loss to constrain the 3D positions associated with static objects (e.g., 303F). The system may not constrain any 3D positions (e.g., 303C, 303D) that fall within a margin range 302 to the surface 301. The system may determine a corresponding color value by aggregating all color values at the 3D locations along the ray 303A as modulated by the corresponding volume density values.

In particular embodiments, the system may train the MLP using small batch of iterations with specific loss functions as discussed above. In particular embodiments, the system may determine locations for the color, depth, and free-space supervisions explicitly dictated by quadrature used by volume rendering. The system may determine where to apply the static constraints. For example, the system may use apply the constraints at the same sampling locations that are used for other losses. The system can then randomly draw another time t' that is distinct from the current time t and enforce the MLP to produce similar appearances and volume densities at these two spatiotemporal locations. However, in particular embodiments, there may be a large part of the scene unconstrained when the camera motion is large. Uniformly sampling in the scene bounding volume may also not be ideal since sampling would be highly inefficient because of perspective projection (except for special cases like a camera circling some bounded volume). In particular embodiments, as a solution to meet both the sampling efficiency and the sample coverage, the system may take the union of all sampling locations along all rays of all frames to form the sample pool $\chi$ and may exclude all points that are closer to any observed surfaces than a threshold e (e.g., margin 302 in FIG. 3). The system may randomly draw a fixed number of sampling locations from the training sample pool at each training iteration and may add small random jitters to each sampling location. At time t' the static scene loss that is measured against may also be randomly chosen for each sample location x, while ensuring the resulting location (x, t') is not close to any scene surfaces.

In particular embodiments, the system may use volume rendering for both RGB and depth. The system may accumulate the value the along the caste ray to determine the RGB values or the depth values. For example, to determine a color value, the system may aggregate all color values at the 3D locations along the casted ray as modulated by the corresponding volume density values. As another example, to determine a depth value, the system may aggregate all depth values at the 3D locations along the casted ray as modulated by the corresponding volume densities. The volume may be transparent or close to transparent (low volume density) up to certain point (e.g., an object surface). Then, the volume density may rise quickly indicating that there are some surfaces around that areas. Using volume rendering for both color and depth rendering may have RGB values with higher densities to have a higher impact on the rendered color. For depth rendering, when the system queries along a ray, the system may determine 3D positions along that ray. These 3D positions may determine how far the corresponding points are from the camera position, that is depth value. Using the volume rendering, the system may determine depth value for each 3D position along the casted ray and modulate these depth values with corresponding volume densities. For positions with higher volume density values, that particular depth value may have high contribution in the final depth value.

In particular embodiments, when an image has content with high spatial frequencies, the image may be more likely to have motion blur than an image having low spatial frequency content and the system may adopt a shorter persistence time. However, if the frame rate is fixed, a shorter persistence may lead to a dimmer result in the displayed image. The system may increase the frame rate to keep the brightness level and also to avoid flicker artifacts. In particular embodiments, the system may determine a frame rate for displaying the image based on the one or more characteristics of the image content. The characteristics of the image content may be in the temporal frequency domain (e.g., the spatial frequency) or/and in the temporal frequency domain (e.g., the temporal frequency). The characteristics may include, for example, but are not limited to, spatial frequency components higher than a threshold spatial frequency, spatial frequency components lower than a threshold spatial frequency, temporal frequency components higher than a temporal frequency threshold, temporal frequency components lower than a temporal frequency threshold, spatiotemporal power components falling with a particular spatiotemporal frequency range, etc. Then, the system may configure the display to display the image using the frame rate.

In particular embodiments, the system may determine the frame rate for displaying an image based on the user head motion velocity or eye motion velocity. In general, when the user's head or eye moves with a higher velocity, the user may be more likely to perceive motion blur. The system may adopt the shorter persistence and, at the same time, a higher frame rate to void the motion blur and possible flickers. On the other hand, when the user's head or eye moves with a lower velocity, the user may be less likely to perceive motion blur. The system may adopt the longer persistence and a lower frame rate.

In particular embodiments, the system may determine the frame rate for displaying an image based on the contrast level between the image content and the background for the image to be displayed in. In general, when the image content and the background have a higher contrast level, the user may be more likely to perceive motion blur. The system may adopt the shorter persistence and, at the same time, a higher frame rate to void the motion blur and possible flickers. On the other hand, when the image content and the background have a lower contrast level, the user may be less likely to perceive motion blur. The system may adopt the longer persistence and a lower frame rate.

In particular embodiments, the system may determine an optimized frame rate for displaying the images based on multiple factors. In particular embodiments, the system may determine a frame rate for displaying images based on image content (spatial frequency), user head velocity, and image content background contrast, respectively, and determine an optimized frame rate based on the separately determined frame rates. For example, the optimized frame rate may be a weighted average of the separately determined frame rates. As another example, the optimized framer rate may be the highest or lowest frame rate selected from the frame rates determined based on image content (spatial frequency), user head velocity, and image content background contrast, respectively. After the optimized frame rate is determined, the system may configure the display to display the corresponding images using the optimized frame rate.

In particular embodiments, the system may use a single casually captured video (e.g., cell phone videos) to generate 4D (x, y, z, t) content representation for a scene. The 4D representation may be queried to generate image of the scene from any viewpoints, view directions, and time. This may be different from 3D photos, where the scene is static because the video may include moving objects (e.g., kids, dogs, people, vehicles, etc.). Instead of processing the images frame by frame separately, the system may collectively create the 4D representation based on all images in the video. The system may have temporal consistence and include some objects that can be seen from some images but cannot be seen from other images.

In particular embodiments, the system may have a casually captured video (e.g., by a single camera on cell phone or a normal camera) as the input and output the 4D representation in the form of neural network that was trained to represent the spatiotemporal neural radiance or radiance fields, which allows the system to render an image for any viewpoints, view directions, and any time moments of the scene. As an example and not by way of limitation, the system may first take a number of images from a video and generate depth map for each image. The geometry information as represented by the depth maps may be frame by frame and may be dependent on the viewpoint and view direction of the camera. Then, the system may use multiple depth maps with corresponding camera pose for each image and the RGB images to train the representation, defined in neural network, which may be a multiple layer perceptual (MLP) network with fully connected layers. The system may use the NeIF framework to learn information from the training data. Comparing to NeRF, which is for static scene, Nerf may be the function of viewpoint, view direction and time. To generate an image for a particular viewpoint, view direction and time, the system may cast a ray for each and every pixel of the image. For each casted ray, the system may query the trained the network to determine a number of 3D depth points along that ray and query the Nerf to determine the color values for each of these points. Then, the system may color values for the corresponding pixels by integrating the color values associated with these locations along the catted ray. The pixel values may be determined by accumulating the color values of the locations along the ray as modulated by the corresponding volume densities. The system may query with time particular view positions and view directions and different time, or query with different view positions and view directions with fixed time, or query with different view positions, different view directions, and different time based on what is needed to represent the scene to the user.

Figure 4:
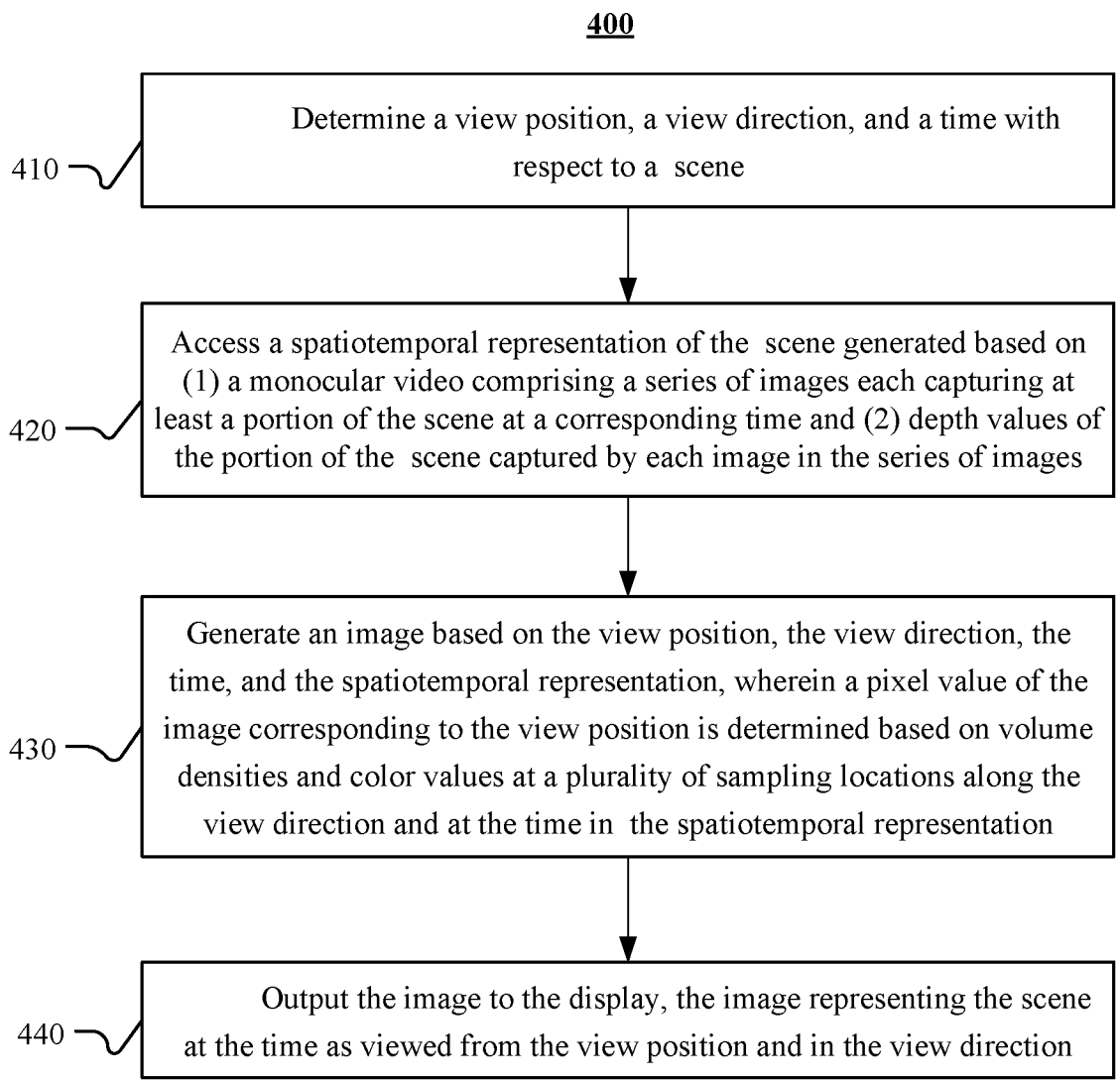
FIG. 4 illustrates an example method of using a space-time representation to generate image corresponding to an arbitrary view direction and time.

FIG. 4 illustrates an example method 400 of using a spatiotemporal representation of a scene to generate image of the scene for an arbitrary view position, view direction and time. The method may begin at step 410, where a computing system may determine a view position, a view direction, and a time with respect to a scene. At step 420, the system may access a spatiotemporal representation of the scene generated based on (1) a monocular video having a series of images each capturing at least a portion of the scene at a corresponding time and (2) depth values of the portion of the scene captured by each image in the series of images. At step 430, the system may generate an image based on the view position, the view direction, the time, and the spatiotemporal representation. A pixel value of the image corresponding to the view position may be determined based on volume densities and color values at a plurality of sampling locations along the view direction and at the time in the spatiotemporal representation. At step 440, the system may output the image to the display. The image may represent the scene at the time as viewed from the view position and in the view direction.

In particular embodiments, the pixel of the image may be determined by integrating the color values at the number of sampling locations along the view direction of the user as weighted by the volume densities and at the time in the spatiotemporal representation. In particular embodiments, the spatiotemporal representation of the scene may be or include a neural network. In particular embodiments, the neural network may be trained based on randomly selected training samples from a training sample pool having a number of training samples in the three-dimensional space. The training samples in the three-dimensional space may be generated based on the series of images of the video and corresponding depth maps. In particular embodiments, the neural network may be trained using training samples excluding direct three-dimensional ground truth data of time-varying three-dimensional geometries in the scene.

In particular embodiments, the neural network may be trained under one or more constraints of: a color reconstruction constraint, a depth reconstruction constraint, an empty-space constraint, or a static scene constraint. In particular embodiments, the color reconstruction constraint may be associated with a color reconstruction loss function which minimizes RGB color value loss of generated images and corresponding input images. In particular embodiments, the depth reconstruction constraint may be associated with a depth reconstruction loss function which minimizes depth reconstruction loss to address the motion-appearance ambiguity. In particular embodiments, the one or more time-varying geometries in the scene may be constrained using depth maps of the series of images of the video. In particular embodiments, the empty-space constraint may be associated with an empty loss function. The empty space between the viewpoint of the user and a first visible surface in the scene may be constrained by penalizing non-zero volume densities along each view direction up to a point no closer than a pre-determined threshold margin. In particular embodiments, the empty-space constraint combined with the depth reconstruction constraint may provide geometric constraints for the spatiotemporal representation up to a threshold distance range to scene surfaces at each frame. In particular embodiments, the static scene constraint may be associated with a static scene loss function. The static scene constraint may constrain the spatio-temporal representation by propagating partially observed contents across time and by constraining spaces surrounding scene surface regions. In particular embodiments, the neural network may be trained using a total loss function corresponding to a linear combination of the color reconstruction constraint, the depth reconstruction constraint, the empty-space constraint, and the static scene constraint.

Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for using a spatiotemporal representation of a scene to generate image of the scene for an arbitrary view position, view direction and time including the particular steps of the method of FIG. 9, this disclosure contemplates any suitable method for using a spatiotemporal representation of a scene to generate image of the scene for an arbitrary view position, view direction and time including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9.

Figure 5:
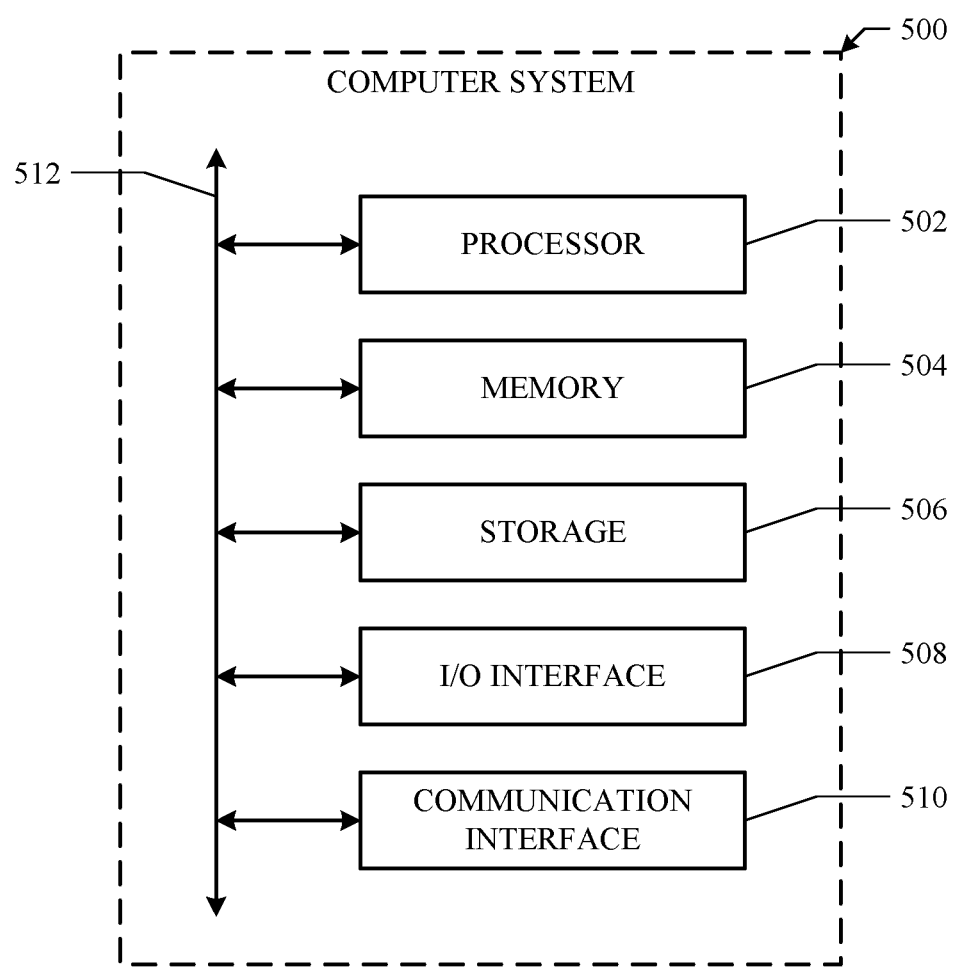
FIG. 5 illustrates an example computer system.

FIG. 5 illustrates an example computer system 500. In particular embodiments, one or more computer systems 500 perform one or more steps of one or more methods described or illustrated herein. In particular embodiments, one or more computer systems 500 provide functionality described or illustrated herein. In particular embodiments, software running on one or more computer systems 500 performs one or more steps of one or more methods described or illustrated herein or provides functionality described or illustrated herein. Particular embodiments include one or more portions of one or more computer systems 500. Herein, reference to a computer system may encompass a computing device, and vice versa, where appropriate. Moreover, reference to a computer system may encompass one or more computer systems, where appropriate.

This disclosure contemplates any suitable number of computer systems 500. This disclosure contemplates computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 500 may include one or more computer systems 500; be unitary or distributed; span multiple locations; span multiple machines; span multiple data centers; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

In particular embodiments, computer system 500 includes a processor 502, memory 504, storage 1006, an input/output (I/O) interface 508, a communication interface 510, and a bus 512. Although this disclosure describes and illustrates a particular computer system having a particular number of particular components in a particular arrangement, this disclosure contemplates any suitable computer system having any suitable number of any suitable components in any suitable arrangement.

In particular embodiments, processor 502 includes hardware for executing instructions, such as those making up a computer program. As an example and not by way of limitation, to execute instructions, processor 502 may retrieve (or fetch) the instructions from an internal register, an internal cache, memory 504, or storage 1006; decode and execute them; and then write one or more results to an internal register, an internal cache, memory 504, or storage 1006. In particular embodiments, processor 502 may include one or more internal caches for data, instructions, or addresses. This disclosure contemplates processor 502 including any suitable number of any suitable internal caches, where appropriate. As an example and not by way of limitation, processor 502 may include one or more instruction caches, one or more data caches, and one or more translation lookaside buffers (TLBs). Instructions in the instruction caches may be copies of instructions in memory 504 or storage 1006, and the instruction caches may speed up retrieval of those instructions by processor 502. Data in the data caches may be copies of data in memory 504 or storage 1006 for instructions executing at processor 502 to operate on; the results of previous instructions executed at processor 502 for access by subsequent instructions executing at processor 502 or for writing to memory 504 or storage 1006; or other suitable data. The data caches may speed up read or write operations by processor 502. The TLBs may speed up virtual-address translation for processor 502. In particular embodiments, processor 502 may include one or more internal registers for data, instructions, or addresses. This disclosure contemplates processor 502 including any suitable number of any suitable internal registers, where appropriate. Where appropriate, processor 502 may include one or more arithmetic logic units (ALUs); be a multi-core processor; or include one or more processors 502. Although this disclosure describes and illustrates a particular processor, this disclosure contemplates any suitable processor.

In particular embodiments, memory 504 includes main memory for storing instructions for processor 502 to execute or data for processor 502 to operate on. As an example and not by way of limitation, computer system 500 may load instructions from storage 1006 or another source (such as, for example, another computer system 500) to memory 504. Processor 502 may then load the instructions from memory 504 to an internal register or internal cache. To execute the instructions, processor 502 may retrieve the instructions from the internal register or internal cache and decode them. During or after execution of the instructions, processor 502 may write one or more results (which may be intermediate or final results) to the internal register or internal cache. Processor 502 may then write one or more of those results to memory 504. In particular embodiments, processor 502 executes only instructions in one or more internal registers or internal caches or in memory 504 (as opposed to storage 1006 or elsewhere) and operates only on data in one or more internal registers or internal caches or in memory 504 (as opposed to storage 1006 or elsewhere). One or more memory buses (which may each include an address bus and a data bus) may couple processor 502 to memory 504. Bus 512 may include one or more memory buses, as described below. In particular embodiments, one or more memory management units (MMUs) reside between processor 502 and memory 504 and facilitate accesses to memory 504 requested by processor 502. In particular embodiments, memory 504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 504 may include one or more memories 504, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 500, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 502 and storage 1006, where appropriate. Where appropriate, storage 1006 may include one or more storages 1006. Although this disclosure describes and illustrates particular storage, this disclosure contemplates any suitable storage.

In particular embodiments, I/O interface 508 includes hardware, software, or both, providing one or more interfaces for communication between computer system 500 and one or more I/O devices. Computer system 500 may include one or more of these I/O devices, where appropriate. One or more of these I/O devices may enable communication between a person and computer system 500. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 508 for them. Where appropriate, I/O interface 508 may include one or more device or software drivers enabling processor 502 to drive one or more of these I/O devices. I/O interface 508 may include one or more I/O interfaces 508, where appropriate. Although this disclosure describes and illustrates a particular I/O interface, this disclosure contemplates any suitable I/O interface.

In particular embodiments, communication interface 510 includes hardware, software, or both providing one or more interfaces for communication (such as, for example, packet-based communication) between computer system 500 and one or more other computer systems 500 or one or more networks. As an example and not by way of limitation, communication interface 510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 510 for it. As an example and not by way of limitation, computer system 500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 500 may include any suitable communication interface 510 for any of these networks, where appropriate. Communication interface 510 may include one or more communication interfaces 510, where appropriate. Although this disclosure describes and illustrates a particular communication interface, this disclosure contemplates any suitable communication interface.

In particular embodiments, bus 512 includes hardware, software, or both coupling components of computer system 500 to each other. As an example and not by way of limitation, bus 512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 512 may include one or more buses 512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a computing system:
   determining a view position, a view direction, and a time with respect to a scene;
   accessing a spatiotemporal representation of the scene generated based on (1) a monocular video comprising a series of images each capturing at least a portion of the scene at a corresponding time and (2) depth values of the portion of the scene captured by each image in the series of images, wherein the spatiotemporal representation comprises a neural network trained under a static scene constraint associated with a static scene loss function, and wherein the static scene constraint constrains the spatiotemporal representation by propagating partially observed contents across time and by constraining spaces surrounding scene surface regions;
   generating an image based on the view position, the view direction, the time, and the spatiotemporal representation, wherein a pixel value of the image corresponding to the view position is determined based on volume densities and color values at a plurality of sampling locations along the view direction and at the time in the spatiotemporal representation; and
   outputting the image to the display, the image representing the scene at the time as viewed from the view position and in the view direction.

2. The method of claim 1, wherein the pixel value of the image is determined by integrating the color values at the plurality of sampling locations along the view direction of the user and at the time as weighted by the volume densities.

3. The method of claim 1, wherein the neural network is trained based on randomly selected training samples from a training sample pool comprising a plurality of training samples in a three-dimensional space, and wherein the plurality of training samples in the three-dimensional space is generated based on the series of images of the monocular video and corresponding depth maps.

4. The method of claim 1, wherein the neural network is trained using training samples excluding direct three-dimensional ground truth data of time-varying three-dimensional geometries in the scene.

5. The method of claim 1, wherein the neural network is trained under one or more constraints of: a color reconstruction constraint, a depth reconstruction constraint, or an empty-space constraint.

6. The method of claim 5, wherein the color reconstruction constraint is associated with a color reconstruction loss function which minimizes RGB color value loss of generated images with respect to corresponding input images.

7. The method of claim 5, wherein the depth reconstruction constraint is associated with a depth reconstruction loss function which minimizes depth reconstruction loss to address motion-appearance ambiguity.

8. The method of claim 7, wherein one or more time-varying geometries in the scene are constrained using depth maps of the series of images of the monocular video.

9. The method of claim 5, wherein the empty-space constraint is associated with an empty space loss function, and wherein empty space between the view position of the user and a first visible surface in the scene is constrained by penalizing non-zero volume densities along each view direction up to a point no closer than a pre-determined threshold margin.

10. The method of claim 9, wherein the empty-space constraint combined with the depth reconstruction constraint provide geometric constraints for the spatiotemporal representation up to a threshold distance range to scene surfaces at each frame.

11. The method of claim 5, wherein the neural network is trained using a total loss function corresponding to a linear combination of the color reconstruction constraint, the depth reconstruction constraint, the empty-space constraint, and the static scene constraint.

12. The method of claim 1, wherein the neural network is a neural radiance field model comprising a multi-layer perception model trained for generating images of the scene for arbitrary view positions and arbitrary times.

13. The method of claim 1, wherein the image is outputted to the display with a frame rate determined based on one or more factors comprising one or more of: a user head moving velocity, an image content-background contrast, or a spatial frequency associated with an image content.

14. The method of claim 1, wherein the scene is a dynamic scene that changes over time, and wherein the spatiotemporal representation is a 4D space-time radiance field that maps spatiotemporal locations to respective color values and volume densities at corresponding times.

15. The method of claim 1, wherein the spatiotemporal representation is generated by aggregating a plurality of depth maps associated with the scene and RGB information associated with the scene.

16. One or more computer-readable non-transitory storage media embodying software that is operable when executed to:
   determine a view position, a view direction, and a time with respect to a scene;
   access a spatiotemporal representation of the scene generated based on (1) a monocular video comprising a series of images each capturing at least a portion of the scene at a corresponding time and (2) depth values of the portion of the scene captured by each image in the series of images, wherein the spatiotemporal representation comprises a neural network trained under a static scene constraint associated with a static scene loss function, and wherein the static scene constraint constrains the spatio-temporal representation by propagating partially observed contents across time and by constraining spaces surrounding scene surface regions;
   generate an image based on the view position, the view direction, the time, and the spatiotemporal representation, wherein a pixel value of the image corresponding to the view position is determined based on volume densities and color values at a plurality of sampling locations along the view direction and at the time in the spatiotemporal representation; and
   output the image to the display, the image representing the scene at the time as viewed from the view position and in the view direction.

17. The media of claim 16, wherein the pixel value of the image is determined by integrating the color values at the plurality of sampling locations along the view direction of the user and at the time as weighted by the volume densities.

18. The media of claim 16, wherein the neural network is trained based on randomly selected training samples from a training sample pool comprising a plurality of training samples in a three-dimensional space, and wherein the plurality of training samples in the three-dimensional space is generated based on the series of images of the monocular video and corresponding depth maps.

19. A system comprising:
   one or more processors; and
   one or more computer-readable non-transitory storage media coupled to one or more of the processors and comprising instructions operable when executed by one or more of the processors to cause the system to:
      determine a view position, a view direction, and a time with respect to a scene;
      access a spatiotemporal representation of the scene generated based on (1) a monocular video comprising a series of images each capturing at least a portion of the scene at a corresponding time and (2) depth values of the portion of the scene captured by each image in the series of images, wherein the spatiotemporal representation comprises a neural network trained under a static scene constraint associated with a static scene loss function, and wherein the static scene constraint constrains the spatio-temporal representation by propagating partially observed contents across time and by constraining spaces surrounding scene surface regions;
      generate an image based on the view position, the view direction, the time, and the spatiotemporal representation, wherein a pixel value of the image corresponding to the view position is determined based on volume densities and color values at a plurality of sampling locations along the view direction and at the time in the spatiotemporal representation; and
      output the image to the display, the image representing the scene at the time as viewed from the view position and in the view direction.

20. The system of claim 19, wherein the pixel value of the image is determined by integrating the color values at the plurality of sampling locations along the view direction of the user as weighted by the volume densities and at the time.

* * * * *